US010618527B2

(12) United States Patent
Fukuda et al.

(10) Patent No.: US 10,618,527 B2
(45) Date of Patent: Apr. 14, 2020

(54) HYDRAULIC SYSTEM FOR WORK MACHINE

(71) Applicant: KUBOTA CORPORATION, Osaka-shi (JP)

(72) Inventors: Yuji Fukuda, Sakai (JP); Ryosuke Kinugawa, Sakai (JP); Kazuyoshi Arii, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 138 days.

(21) Appl. No.: 15/475,136

(22) Filed: Mar. 31, 2017

(65) Prior Publication Data

US 2017/0282934 A1   Oct. 5, 2017

(30) Foreign Application Priority Data

Mar. 31, 2016 (JP) ................................. 2016-072867
Apr. 6, 2016 (JP) ................................. 2016-076632

(51) Int. Cl.
*B60W 50/08* (2020.01)
*B60W 30/188* (2012.01)

(52) U.S. Cl.
CPC ...... *B60W 50/085* (2013.01); *B60W 30/1884* (2013.01); *B60W 2300/17* (2013.01);
(Continued)

(58) Field of Classification Search
CPC ........... B60W 30/1884; B60W 50/085; B60W 2710/305; B60W 2510/0652
(Continued)

(56) References Cited

U.S. PATENT DOCUMENTS 7,416,045 B2 * 8/2008 Gleasman ............ B60K 17/105
180/305
7,596,945 B2 * 10/2009 Iwamoto ............... B60W 10/06
60/431
(Continued)

FOREIGN PATENT DOCUMENTS

DE          3603630      8/1987
DE        102014004337  10/2014
(Continued)

*Primary Examiner* — Nathaniel E Wiehe
*Assistant Examiner* — Richard C Drake
(74) *Attorney, Agent, or Firm* — Mori & Ward, LLP

(57) ABSTRACT

A hydraulic system for a work machine includes a prime mover, a setup member, a hydraulic pump, an operation valve, a hydraulic device, and a memory. The memory stores first control characteristics indicating relations between the first pressure and an actual revolution speed of the prime mover, and stores a second control characteristic indicating a relation between the first pressure and the actual revolution speed of the prime mover. The hydraulic system includes a controller to set the first pressure based on the second control characteristic when a dropping amount of the actual revolution speed from the target revolution speed is less than a threshold value and to set the first pressure based on the first control characteristics determined corresponding to the target revolution speed when the dropping amount of the actual revolution speed from the target revolution speed is the threshold value or more.

14 Claims, 8 Drawing Sheets

(52) U.S. Cl.
CPC ............... *B60W 2510/0652* (2013.01); *B60W 2710/305* (2013.01)

(58) Field of Classification Search
USPC .......................................................... 60/431
See application file for complete search history.

(56) References Cited

U.S. PATENT DOCUMENTS

| | | | | |
|---|---|---|---|---|
| 8,701,401 B2* | 4/2014 | Ooi | ....................... | E02F 9/2246 60/431 |
| 2006/0201147 A1* | 9/2006 | Nakamura | ............ | B60W 10/30 60/445 |
| 2008/0072588 A1* | 3/2008 | Ariga | .................... | E02F 9/2235 60/449 |
| 2008/0254935 A1* | 10/2008 | Kasuga | .................. | B60K 6/365 477/3 |
| 2010/0083652 A1* | 4/2010 | Fukuda | ............... | F16H 61/4008 60/487 |
| 2013/0036729 A1* | 2/2013 | Kinugawa | ............. | F16H 61/421 60/446 |
| 2014/0075930 A1* | 3/2014 | Maiyur | .................... | F04B 13/00 60/327 |
| 2014/0095035 A1* | 4/2014 | Hoff | ....................... | B60W 10/02 701/60 |
| 2016/0114788 A1* | 4/2016 | Kamatani | ............. | B60K 6/445 701/22 |
| 2017/0159679 A1* | 6/2017 | Fukuda | .................. | E02F 9/2285 |
| 2017/0282934 A1* | 10/2017 | Fukuda | ............. | B60W 30/1884 |
| 2017/0370073 A1* | 12/2017 | Fukuda | ................. | E02F 9/2246 |

FOREIGN PATENT DOCUMENTS

| | | |
|---|---|---|
| JP | 04-119205 | 4/1992 |
| JP | H10/238503 | 9/1998 |
| JP | 2007-10044 | 1/2007 |
| JP | 2010-133469 | 6/2010 |
| JP | 2013-036276 | 2/2013 |
| JP | 2013-78115 | 4/2013 |

* cited by examiner

HYDRAULIC SYSTEM FOR WORK MACHINE

CROSS-REFERENCE TO RELATED APPLICATIONS

The present application claims priority under 35 U.S.C. § 119 to Japanese Patent Application No. 2016-072867, filed Mar. 31, 2016, and to Japanese Patent Application No. 2016-076632, filed Apr. 6, 2016. The contents of these applications are incorporated herein by reference in their entirety.

BACKGROUND OF THE INVENTION

Field of the Invention

The present invention relates to a hydraulic system for a work machine.

Discussion of the Background

Japanese Patent Application Publication No. 2013-78115 discloses a technique for preventing the engine stall in a work machine such as a skid steer loader, a compact track loader, and the like.

The work machine disclosed in Japanese Patent Application Publication No. 2013-78115 includes an engine, an HST pump to be driven by a motive power of the engine, a travel operation device configured to operate the HST pump, a pressure control valve configured to control a travel primary pressure that is a primary pressure of the travel operation device, and a control device configured to control the pressure control valve.

The control device controls the pressure control valve on the basis of a no-load characteristic line and a drop characteristic line, the no-load characteristic line being employed when a load is free, the drop characteristic line being employed when a predetermined load or more is applied to the engine, thereby preventing the engine stall. In other words, the control device controls the pressure control valve when a predetermined travel load or more is applied to the work machine and thus rapidly drops (reduces) the travel primary pressure. In this manner, the control device reduces the dropping of a revolution speed of the engine as much as possible, thereby preventing the engine stall.

In addition, Japanese Patent Application Publication No. 2007-10044 discloses a work machine having a load sensing system.

The work machine disclosed in Japanese Patent Application Publication No. 2007-10044 includes a hydraulic pump configured to discharge an operation fluid, a plurality of hydraulic actuators, and a plurality of control valves configured to control the hydraulic actuators. A relief valve (a main relief valve) is disposed in the vicinity of the hydraulic pump. The work machine includes a load sensing system.

SUMMARY OF THE INVENTION

According to one aspect of the present invention, a hydraulic system for a work machine includes a prime mover, a setup member via which a target revolution speed of the prime mover is set, a hydraulic pump to be operated by the prime mover to output an operation fluid, an operation valve to receive the operation fluid outputted from the hydraulic pump and to set a pressure of the operation fluid outputted from the hydraulic pump to be a first pressure, a hydraulic device to be operated by the operation fluid passing through the operation valve, and a memory. The memory stores first control characteristics indicating relations between the first pressure and an actual revolution speed of the prime mover and a second control characteristic indicating a relation between the first pressure and the actual revolution speed of the prime mover. The hydraulic system includes a controller to set the first pressure based on the second control characteristic when a dropping amount of the actual revolution speed from the target revolution speed is less than a threshold value and to set the first pressure based on the first control characteristics determined corresponding to the target revolution speed when the dropping amount of the actual revolution speed from the target revolution speed is the threshold value or more.

According to another aspect of the present invention, a hydraulic system for a work machine includes a prime mover, a setup member via which a target revolution speed of the prime mover is set, a hydraulic pump to be operated by the prime mover to output an operation fluid, an operation valve to receive the operation fluid outputted from the hydraulic pump to set a pressure of the operation fluid outputted from the hydraulic pump to be a first pressure, a hydraulic device to be operated by the operation fluid passing through the operation valve, and a memory. The memory stores first control characteristics indicating relations between the first pressure and an actual revolution speed of the prime mover, the relations each being defined by different slopes. The hydraulic system includes a controller to set the first pressure based on the first control characteristics when a load equal to or more than a threshold value is applied to the prime mover.

According to further aspect of the present invention, a hydraulic system for a work machine includes a prime mover, a setup member via which a target revolution speed of the prime mover is set, a hydraulic pump to be operated by the prime mover to output an operation fluid, an operation valve to receive the operation fluid outputted from the hydraulic pump to set a pressure of the operation fluid outputted from the hydraulic pump to be a first pressure, a hydraulic device to be operated by the operation fluid passing through the operation valve, and a memory. The memory stores first control characteristics indicating relations between the first pressure and an actual revolution speed of the prime mover, the relations being defined by lines each having parallel or different slopes and a second control characteristic indicating a relation between the first pressure and the actual revolution speed of the prime mover. The hydraulic system includes a controller to set the first pressure based on the second control characteristic when a dropping amount of the actual revolution speed from the target revolution speed is less than a threshold value and to set the first pressure based on the first control characteristics determined corresponding to the target revolution speed when the dropping amount of the actual revolution speed from the target revolution speed is the threshold value or more.

According to further aspect of the present invention, a hydraulic system for a work machine includes a prime mover, a setup member via which a target revolution speed of the prime mover is set, a hydraulic pump to be operated by the prime mover to output an operation fluid, an operation valve to receive the operation fluid outputted from the hydraulic pump to set a pressure of the operation fluid outputted from the hydraulic pump to be a first pressure, a hydraulic device to be operated by the operation fluid passing through the operation valve, and a memory. The memory stores first control characteristics indicating relations between the first pressure and an actual revolution speed of the prime mover, the relations each being defined by different slopes. The hydraulic system includes a controller to set the first pressure based on the first control characteristics determined corresponding to the target revolution speed when the dropping amount of the actual revolution speed from the target revolution speed is a threshold value or more.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
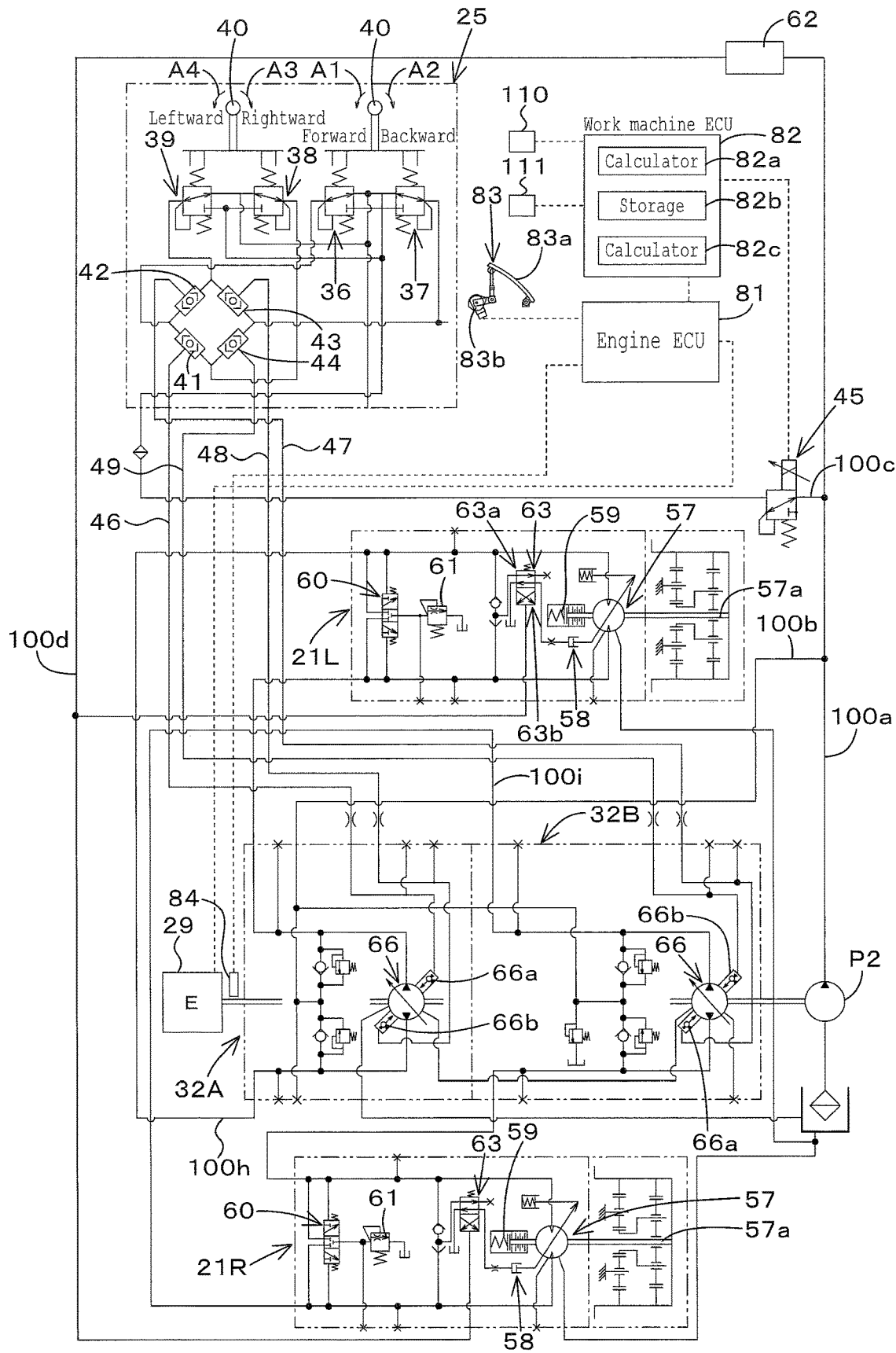
FIG. 1 is a view illustrating a hydraulic system (a hydraulic circuit) for traveling according to a first embodiment of the present invention, the hydraulic system being included in a work machine.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, preferred embodiments of the present invention will be described below, the preferred embodiments describing a hydraulic system for a work machine and the work machine including the hydraulic system.

First Embodiment

Referring to the drawings, a first embodiment of the present invention will be explained below.

Figure 7:
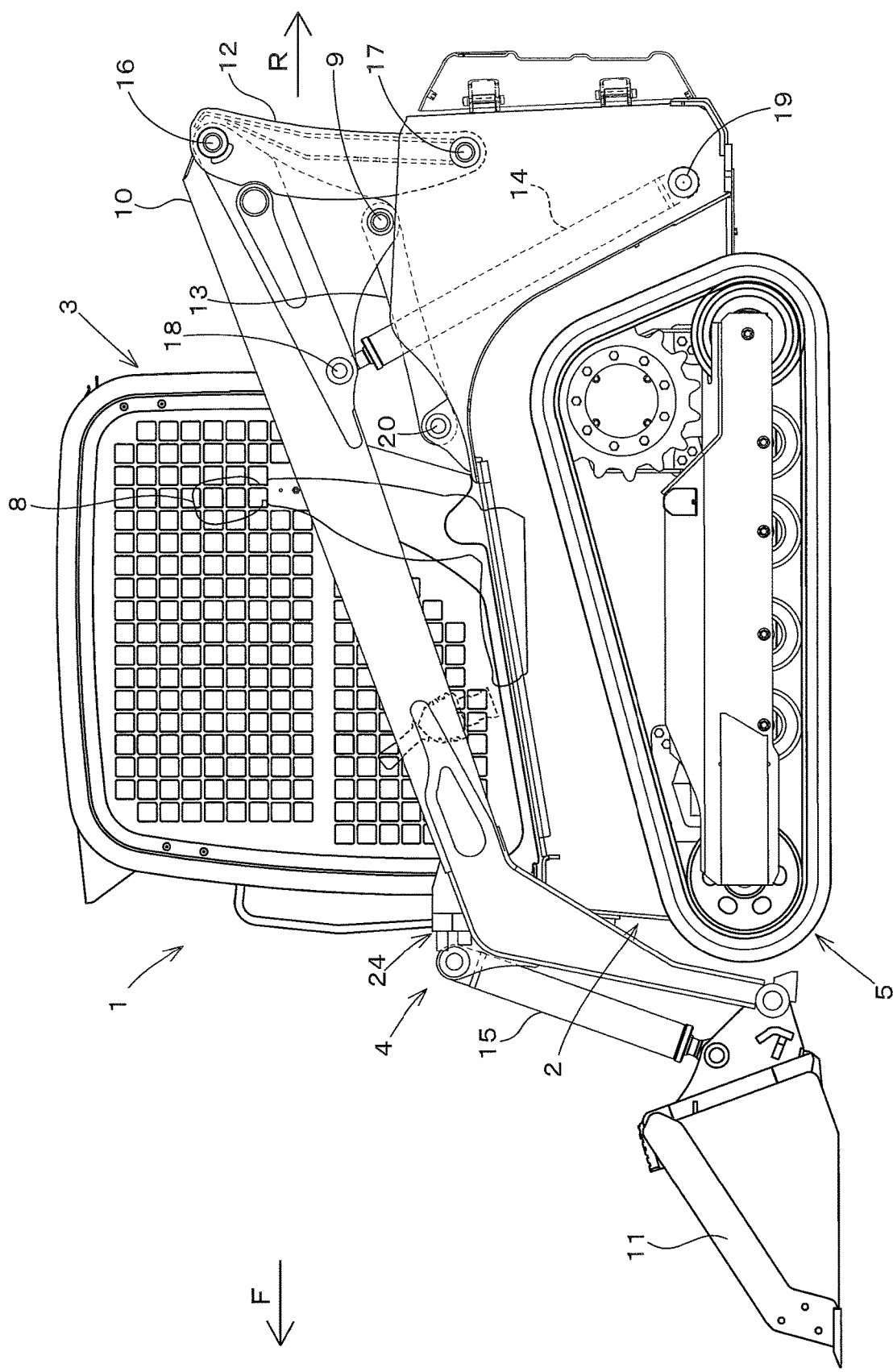
FIG. 7 is a side view illustrating a track loader as an example of the work machine according to the embodiments of the present invention.

FIG. 7 shows a side view of a work machine according to the first embodiment of the present invention. FIG. 7 shows a compact track loader as an example of the work machine. However, the work machine according to the embodiment is not limited to the compact track loader. The work machine may be another type of loader machine such as a skid steer loader. Further, the work machine maybe a machine other than the loader machine.

Figure 8:
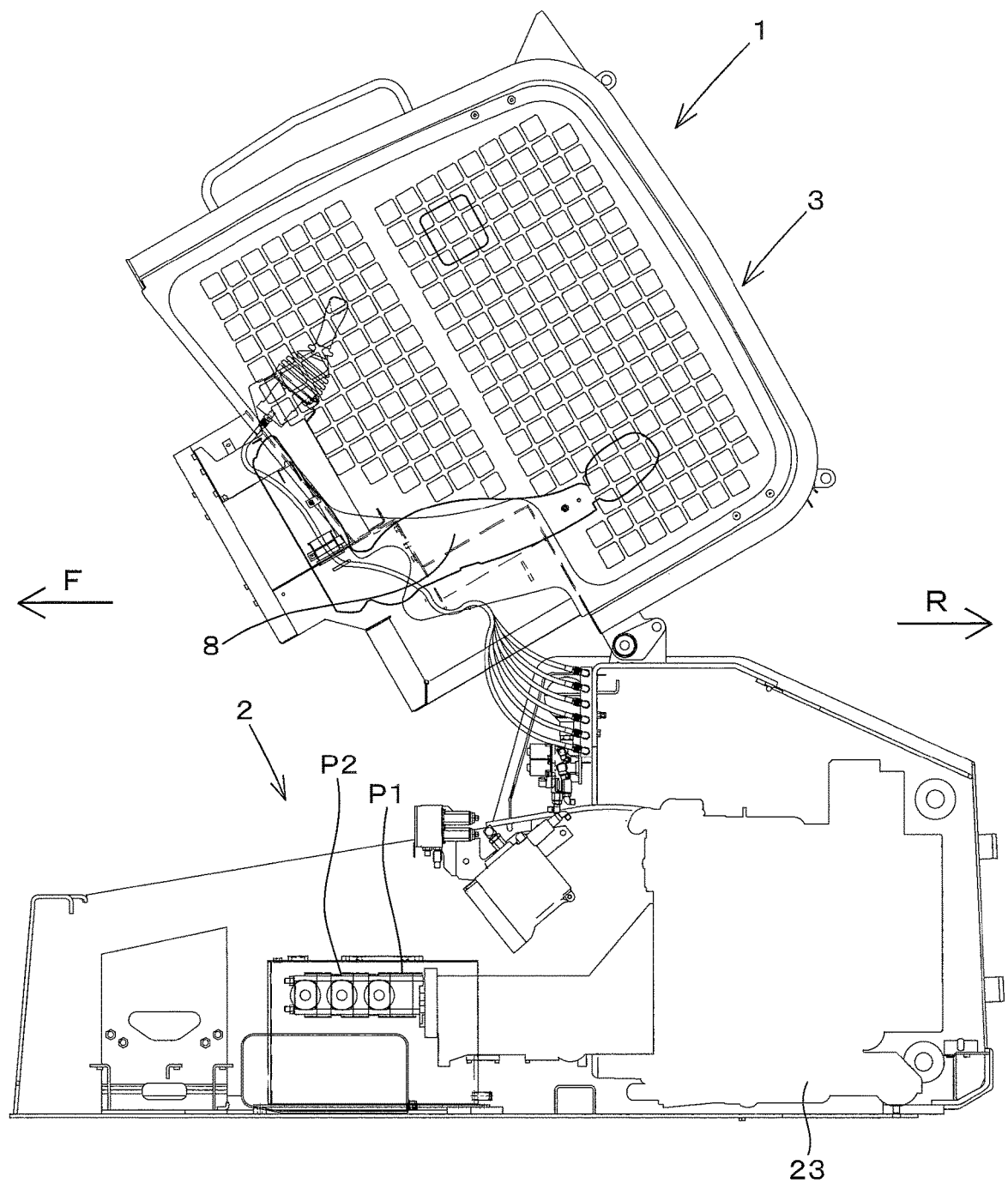
FIG. 8 is a side view illustrating a part of the track loader lifting up a cabin according to the embodiments.

As shown in FIG. 7 and FIG. 8, the work machine 1 includes a machine body 2, a cabin 3, an operation device 4, and a travel device 5. In explanations of the embodiment of the present invention, a forward direction (a direction shown by an arrowed line F in FIG. 7) corresponds to a front side of an operator seating on an operator seat 8 of the work machine 1, a backward direction (a direction shown by an arrowed line R in FIG. 7) corresponds to a back side of the operator, a leftward direction (a direction vertically extending from a back surface to a front surface of FIG. 7) corresponds to a left side of the operator, and a rightward direction (a direction vertically extending from the front surface to the back surface of FIG. 7) corresponds to a right side of the operator.

In the embodiment, a machine width direction corresponds to a horizontal direction that is a direction perpendicular to the forward direction and the backward direction. And, a machine outward direction corresponds to a direction toward the rightward direction from a center portion of the machine body 2 and corresponds to a direction toward the leftward direction from a center portion of the machine body 2. In other words, the machine outward direction is equivalent to the machine width direction and is a direction separating from the machine body 2.

In the embodiment, a direction opposite to the machine outward direction is referred to as a machine inward direction. In other words, the machine inward direction is equivalent to the machine width direction and is a direction being closed to the machine body 2.

A cabin 3 is mounted on the machine body 2. The operator seat 8 is installed in the cabin 3. The operation device 4 is attached to the machine body 2. The travel device 5 is disposed on an outer side of the machine body 2. A motor 29 (a prime mover 29) is mounted on a rear portion of the machine body 2. The motor 29 (the prime mover 29) is a diesel engine, for example. The motor 29 (the prime mover 29) is not limited to a specific device and may be an electric motor or a combination of the diesel engine and the electric motor.

The operation device 4 includes a bool 10, an work tool 11, a lift link 12, a control link 13, a boom cylinder 14, and a bucket cylinder 15.

The boom 10 is disposed on the side of the cabin 3, and is capable of being swung upward and downward. The work tool 11 is a basket, for example. The basket 11 is disposed on a tip portion (a front end portion) of the boom 10, and is capable of being swung upward and downward.

The lift link 12 and the control link 13 support a base portion (a rear portion) of the boom 10, and thus swing the boom 10 upward and downward. The boom cylinder 14 is stretched and shortened to move the boom 10 upward and downward. The bucket cylinder 15 is stretched and shortened to swing the bucket 11.

The lift link 12, the control link 13, and the boom cylinder 14 are disposed on the side of the machine body 2 and correspond to the boom 10 on the same side.

The lift link 12 is disposed substantially vertically on a rear portion of a base portion of the boom 10. An upper portion (one end portion) of the lift link 12 is pivotally supported rotatably about a lateral shaft by a pivot shaft 16 (a first pivot shaft) on a portion close to the rear portion of the base portion of the boom 10. In addition, a lower portion (the other end portion) of the lift link 12 is pivotally supported rotatably about a lateral shaft by a pivot shaft 17 (a second pivot shaft) on a portion close to the rear portion of the machine body 2. The second pivot shaft 17 is disposed below the first pivot shaft 16.

An upper portion of the boom cylinder 14 is pivotally supported rotatably about a lateral shaft by a pivot shaft 18 (a third pivot shaft). The third pivot shaft 18 is disposed on the base portion of the boom 10, specifically disposed on a front portion of the base portion.

An lower portion of the boom cylinder 14 is pivotally supported rotatably about a lateral shaft by a pivot shaft 19 (a fourth pivot shaft). The fourth pivot shaft 19 is disposed on a portion close to a lower portion of the rear portion of the machine body 2, specifically disposed below the third pivot shaft 18.

The control link 13 is disposed forward from the lift link 12. One end of the control link 13 is pivotally supported rotatably about a lateral shaft by a pivot shaft 20 (a fifth pivot shaft).

The fifth pivot shaft 20 is disposed on the machine body 2, specifically disposed on a portion corresponding to and forward from the lift link 12.

The other end of the control link 13 is pivotally supported rotatably about a lateral shaft by a pivot shaft 9 (a sixth pivot shaft). The sixth pivot shaft 9 is disposed on the boom 10 forward from the second pivot shaft 17 and above the second pivot shaft 17.

The boom cylinder 14 is stretched and shortened to swing the boom 10 upward and downward about the first pivot shaft 16 with the base portion of the boom 10 supported by the lift link 12 and the control link 13, thereby moving the tip portion of the boom 10 upward and downward.

The control link 13 is swung upward and downward about the fifth pivot shaft 20 in accordance with the swinging of the boom 10. The lift link 12 is swung forward and backward about the second pivot shaft 17 in accordance with the swinging of the control link 13.

The front portion of the boom 10 is capable of attaching other work tools instead of the bucket 11. The following attachments (auxiliary attachments) are exemplified as the other work tools; for example, a hydraulic crusher, a hydraulic breaker, an angle broom, an earth auger, a pallet fork, a sweeper, a mower, a snow blower, and the like.

A connection member 24 is disposed on the front portion of the boom 10. The connection member 24 is a device for connecting a hydraulic device of an auxiliary attachment to a first tube member pipe such as a pipe disposed on the boom 10.

Specifically, The first tube member is capable of being connected to one end of the connection member 24, and a second tube member is capable of being connected to the other end of the connection member 24, the second tube member being connected to the hydraulic device of the auxiliary attachment. In this manner, the operation fluid flowing in the first tube member is supplied to the hydraulic device through the second tube member.

The bucket cylinders 15 are arranged on portions close to the front portion of the boom 10. The bucket cylinders 15 are stretched and shortened to swing the bucket 11.

The travel device 5 employs a travel device of a crawler type (including a semi-crawler type) in the embodiment. The travel device 5 may employ a travel device of a wheel type having the front wheels and the rear wheels.

The hydraulic system for the work machine according to the embodiment will be explained below.

Figure 2:
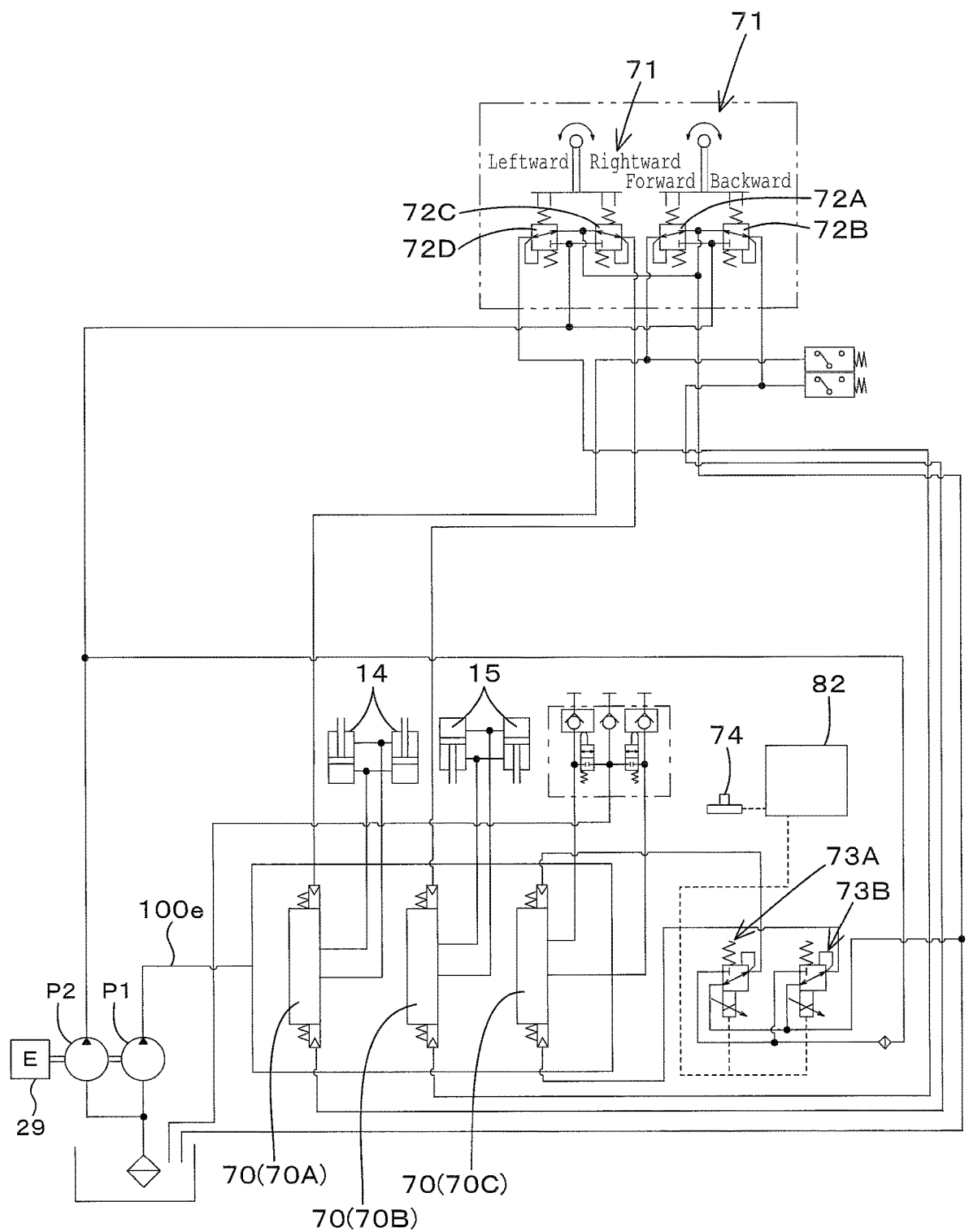
FIG. 2 is a view illustrating a hydraulic system (a hydraulic circuit) for operating according to the first embodiment, the hydraulic system being included in the work machine.

FIG. 1 is an overall view illustrating the hydraulic system for traveling according to the embodiment. FIG. 2 is an overall view illustrating the hydraulic system for operating according to the embodiment.

The hydraulic system for traveling will be explained first. As shown in FIG. 1 and FIG. 2, the hydraulic system (a hydraulic circuit) includes a first hydraulic pump P1 and a second hydraulic pump P2. The first hydraulic pump P1 and the second hydraulic pump P2 are hydraulic pumps configured to be driven by the motor 29.

In addition, the first hydraulic pump P1 and the second hydraulic pump P2 are driven by a motive power of the motor 29, and thus discharge the operation fluid. Each of the first hydraulic pump P1 and the second hydraulic pump P2 is constituted of a gear pump having a constant capacity (a constant capacity gear pump), for example.

The first hydraulic pump P1 (a main pump) is used for driving a hydraulic actuators of the lift cylinder (the boom cylinder) 14, the tilt cylinder 15, and the attachment attached to a tip end of the boom 10.

The second hydraulic pump P2 (the pilot pump, the charge pump) are used mainly for supplying a control signal (the pilot pressure). For convenience of the explanation, the operation fluid discharged from the second hydraulic pump P2 is referred to as a pilot fluid, and the operation fluid for the control signal is also referred to as the pilot fluid. A pressure of the pilot fluid is referred to as a pilot pressure.

As shown in FIG. 1, a discharge tube (a discharge path) 100*a* is connected to the second hydraulic pump P2. A first supply-discharge tube (a first supply-discharge path) 100*b* and a second supply-discharge tube (a second supply-discharge path) 100*c* are connected to the discharge fluid tube 100*a*. A first drive circuit 32A and a second drive circuit 32B are connected to the first supply-discharge tube 100*b*.

A travel operation device 25 is connected to the second supply-discharge tube 100*c*. An operation valve 45 is connected to an intermediate portion of the second supply-discharge tube 100*c*. In this manner, the operation fluid discharged from the second hydraulic pump P2 is supplied to the operation valve 45. The operation valve 45 is constituted of an electromagnetic proportional valve.

The first drive circuit 32A is a circuit for drive a first travel component 21L disposed on the left of the machine body 2. The first drive circuit 32A and the first travel component 21L constitute an HST (a hydrostatic transmission).

In addition, the first drive circuit 32B is a circuit for drive a second travel component 21R disposed on the right of the machine body 2. The second drive circuit 32B and the second travel component 21R constitute an HST (a hydrostatic transmission).

The first drive circuit 32A includes a travel pump (an HST pump) 66. The travel pump 66 is a hydraulic device capable of being operated by the pilot fluid (the operation fluid) outputted from the operation valve 45. The travel pump 66 is connected to the travel motor (the HST motor) 57 of the corresponding first travel component 21L by a speed-changing fluid tube (a speed-changing fluid path) 100*h* and a speed-changing fluid tube (a speed-changing fluid path) 100*i*.

The second drive circuit 32B has a configuration similar to the configuration of the first drive circuit 32A. Thus, an explanation of the second drive circuit 32B will be omitted.

The travel pump 66 is constituted of a variable displacement axial pump having a swash plate capable of being driven by a motive power of the motor 29, that is, a hydraulic pump (a variable displacement hydraulic pump having a swash plate) to be operated by the pilot pressure, the hydraulic pump being configured to change an angle of the swash plate with use of the pilot pressure. In particular, the travel pump 66 includes a forward pressure-receiving portion 66a and a backward pressure-receiving portion 66b. The pilot pressure is applied to the forward pressure-receiving portion 66a and the backward pressure-receiving portion 66b.

The pilot pressure applied to the pressure-receiving portions 66a and 66b changes the angle of the swash plate. When the angle of the swash plate is changed, a discharge direction and a discharge rate of the operation fluid are changed. In this manner, revolution outputs of the first travel component 21L and the second travel component 21R are changed.

The first travel component 21L includes a travel motor 57 (a hydraulic motor for traveling), a swash plate switch cylinder 58, a first hydraulic switch valve 63, a brake mechanism 59, a flushing valve 60, and a flushing relief valve 61.

The travel motor 57 is a hydraulic device configured to be operated by the pilot fluid (the operation fluid). The travel motor 57 is constituted of a variable displacement axial pump having a swash plate having two speeds, a high speed and a low speed, for example. The swash plate switch cylinder 58 is disposed on the swash plate of the travel motor 57, the swash plate switch cylinder 58 being configured to be stretched and shortened.

The stretching and shortening of the swash-plate switch cylinder 58 change the angle of the swash plate of the travel motor 57. When the angle of the swash plate of the travel motor 57 is changed, the changing of the swash plate switches the travel motor 57 to be in a first speed and to be a second speed.

The first hydraulic switch valve is a two-position switch valve having a spool capable of moving to a first position 63a and to a second position 63b in accordance with a pressure of the pilot fluid (the pilot pressure).

The spool of the first hydraulic switch valve 63 moves to the second position 63b when the pilot pressure reaches a predetermined pressure, and thus changes the operational state. The spool of the first hydraulic switch valve 63 is returned to the first position 63a by a spring when the pilot pressure is less than the predetermined pressure, and thus changes the operational state.

In the operational state where the spool of the first hydraulic switch valve 63 moves to the first position 63a, the pilot pressure is released from the swash plate switch cylinder 58, and thus the swash plate switch cylinder 58 is shortened. In this manner, the travel motor 57 is set to the first speed.

In the operational state where the spool of the first hydraulic switch valve 63 moves to the second position 63b, the pilot pressure is supplied to the swash plate switch cylinder 58, and thus the swash plate switch cylinder 58 is stretched. In this manner, the travel motor 57 is set to the second speed.

The first hydraulic switch valve 63 is switched by the second hydraulic switch valve 62. The first hydraulic switch valve 63 is connected to the second hydraulic switch valve 62 by a third supply-discharge tube (a third supply-discharge path) 100d. The second hydraulic switch valve 62 is a two-position switch valve having a spool capable of moving to a first position and to a second position in accordance with the pressure of the pilot fluid (the pilot pressure).

When the second hydraulic switch valve 62 is at the first position, the first hydraulic switch valve 63 is at the first position 63a. When the second hydraulic switch valve 62 is at the second position, the first hydraulic switch valve 63 is at the second position 63b.

The second hydraulic switch valve 62 is capable of being switched by an electric signal, the pilot pressure, a mechanical operation, and the like. Thus, when the second hydraulic switch valve 62 is switched to the first position and to the second position, the switching switches the travel motor 57 to the first speed and to the second speed.

The travel pump 66 and the travel motor 57 are operated by the travel operation device 25. The travel operation device 25 includes a plurality of remote control valves, a travel lever 40, a first shuttle valve 41, a second shuttle valve 42, a third shuttle valve 43, and a fourth shuttle valve 44.

The plurality of remote control valves includes a remote control valve 36, a remote control valve 37, a remote control valve 38, and a remote control valve 39. The remote control valves 36 to 39 are operated by a single of the travel lever 40. The remote control valves 36 to 39 change the pressure of the operation fluid in accordance with an operation of the travel lever 40 (an operation member).

The travel lever 40 is capable of being tilted forward, backward, toward a width direction perpendicular to the forward direction and the backward direction, and toward a diagonal direction from a neutral position. When the travel lever 40 is tilted, the remote control valves 36, 37, 38, and 39 of the travel operation device 25 are operated. In this manner, the pilot pressure is proportional to an operation extent of the travel lever 40 from the neutral position, and is outputted from secondary ports of the remote control valves 36, 37, 38, and 39.

When the travel lever 40 is tilted forward (toward a direction indicated by an arrowed line A1 in FIG. 1), the remote control valve 36 is operated. In this manner, the pilot pressure is outputted from the remote control valve 36.

The pilot pressure is applied to the forward pressure-receiving portion 66a of the first drive circuit 32A through a first fluid tube (a first fluid path) 46 from the first shuttle valve 41, and is applied to the forward pressure-receiving portion 66a of the second drive circuit 32B through a second fluid tube 47 from the second shuttle valve 42.

In this manner, the output shafts 57a of the first travel component 21L and the second travel component 21R revolve normally (revolve forward) at a speed proportional to an extent of the tilting of the travel lever 40, and thus the track loader 1 travels forward and straight.

In addition, when the travel lever 40 is tilted backward (toward a direction indicated by an arrowed line A2 in FIG. 1), the remote control valve 37 is operated. In this manner, the pilot pressure is outputted from the remote control valve 37.

The pilot pressure is applied to the backward pressure-receiving portion 66b of the first drive circuit 32A through a third fluid tube 48 from the third shuttle valve 43, and is applied to the backward pressure-receiving portion 66b of the second drive circuit 32 through a fourth fluid tube 49 from the fourth shuttle valve 44.

In this manner, the output shafts 57a of the first travel component 21L and the second travel component 21R revolve reversely (revolve backward) at a speed proportional to an extent of the tilting of the travel lever 40, and thus the track loader 1 travels backward and straight.

In addition, when the travel lever 40 is tilted rightward (toward a direction indicated by an arrowed line A3 in FIG. 1), the remote control valve 38 is operated. In this manner, the pilot pressure is outputted from the remote control valve 38.

The pilot pressure is applied to the forward pressure-receiving portion 66a of the first drive circuit 32A through the fluid tube 46 from the first shuttle valve 41, and is applied to the backward pressure-receiving portion 66b of the second drive circuit 32B through the fourth fluid tube 49 from the fourth shuttle valve 44.

In this manner, the output shaft 57a of the first drive component 21L revolves normally, the output shaft 57a of the second drive component 21R revolves reversely, and thus the track loader 1 turns rightward.

In addition, when the travel lever 40 is tilted leftward (toward a direction indicated by an arrowed line A4 in FIG. 1), the remote control valve 39 is operated. In this manner, the pilot pressure is outputted from the remote control valve 39.

The pilot pressure is applied to the forward pressure-receiving portion 66a of the second drive circuit 32B through the second fluid tube 47 from the second shuttle valve 42, and is applied to the backward pressure-receiving portion 66b of the first drive circuit 32A through the third fluid tube 48 from the third shuttle valve 43.

In this manner, the output shaft 57a of the second travel component 21R revolves normally, the output shaft 57a of the first travel component 21L revolve inversely, and thus the track loader 1 turns leftward.

In addition, when the travel lever 40 is tilted diagonally (toward a diagonal direction indicated), a differential pressure is generated between the pilot pressure applied to the forward pressure-receiving portion 66a of the first drive circuit 32A and the pilot pressure applied to the backward pressure-receiving portion 66b of the second drive circuit 32B. The differential pressure determines the revolution directions and the revolution speeds of the output shafts 57a of the first travel component 21L and the second travel component 21R. In this manner, the track loader 1 turns rightward or leftward traveling forward or backward.

That is, when the travel lever 40 is tilted diagonally forward and leftward, the track loader 1 turns leftward traveling forward at a speed corresponding to a tilting angle of the travel lever 40.

In addition, when the travel lever 40 is tilted diagonally forward and rightward, the track loader 1 turns rightward traveling forward at a speed corresponding to a tilting angle of the travel lever 40.

In addition, when the travel lever 40 is tilted diagonally backward and leftward, the track loader 1 turns leftward traveling backward at a speed corresponding to a tilting angle of the travel lever 40.

In addition, when the travel lever 40 is tilted diagonally backward and rightward, the track loader 1 turns rightward traveling backward at a speed corresponding to a tilting angle of the travel lever 40.

The hydraulic system for operating according to the embodiment will be explained below.

As shown in FIG. 2, a discharge fluid tube (a discharge fluid path) 100e is connected to the first hydraulic pump P1. A plurality of control valves 70 are connected to the discharge fluid tube 100e.

The plurality of control valves 70 include a boom control valve 70A, a bucket control valve 70B, and an auxiliary control valve 70C. The boom control valve 70A is a valve for controlling the lift cylinder 14. The bucket control valve 70B is a valve for controlling the tilt cylinder 15. The auxiliary control valve 70C is a valve for controlling a hydraulic actuator of an auxiliary attachment.

In the hydraulic system for operating, the hydraulic actuators of the lift cylinder 14, the tilt cylinder 15, and the auxiliary attachment are referred to as the hydraulic devices.

The boom 10 and the bucket 11 are operated by an operation member 71. The operation member 71 is disposed around the operator seat 8. The operation member 71 is supported to be capable of being tilted forward, backward, toward a width direction perpendicular to the forward direction and the backward direction, and toward a diagonal direction from a neutral position. When the operation member 71 is tilted, a remote control valve 72A, a remote control valve 72B, a remote control valve 72C, and a remote control valve 72D are operated. The remote control valves 72A to 72D are disposed below the operation member 71.

When the operation member 71 is tilted forward, the remote control valve 72A is operated to output the pilot pressure from the remote control valve 72A. The pilot pressure is applied to a pressure-receiving portion of the boom control valve 70A. Then, the operation fluid flowing into the boom control valve 70A is supplied to a rod side of the lift cylinder 14, and thus the boom 10 is moved downward.

When the operation member 71 is tilted backward, the remote control valve 72B is operated to output the pilot pressure from the remote control valve 72B. The pilot pressure is applied to a pressure-receiving portion of the boom control valve 70A. Then, the operation fluid flowing into the boom control valve 70A is supplied to a bottom side of the lift cylinder 14, and thus the boom 10 is moved upward.

That is, the boom control valve 70A is capable of controlling a flow rate of the operation fluid in accordance with a pressure of the operation fluid set by the operation of the operation member 71 (the pilot pressure set by the remote control valve 72A and the pilot pressure set by the remote control valve 72B), the operation fluid flowing into the lift cylinder 14.

When the operation member 71 is tilted rightward, the remote control valve 72C is operated to apply the pilot pressure to the pressure-receiving portion of the bucket control valve 70B. As the result, the bucket control valve 70B is operated to stretch the bucket cylinder (the tilt cylinder 15), and thereby the bucket 11 dumps at a speed proportional to a tilting extent of the operation member 71.

When the operation member 71 is tilted leftward, the remote control valve 72D is operated to apply the pilot pressure to the pressure-receiving portion of the bucket control valve 70B. As the result, the bucket control valve 70B is operated to shorten the tilt cylinder 15, and thereby the bucket 11 shovels at a speed proportional to a tilting extent of the operation member 71.

That is, the bucket control valve 70B is capable of controlling a flow rate of the operation fluid in accordance with a pressure of the operation fluid set by the operation of the operation member 71 (the pilot pressure set by the remote control valve 72C and the pilot pressure set by the remote control valve 72D), the operation fluid flowing into the tilt cylinder 15.

In particular, the remote control valves 72A, 72B, 72C, and 72D change a pressure of the operation fluid in accordance with the operation of the operation member 71, and then supply the operation fluid having the changed pressure to the boom control valve 70A and to the bucket control valve 70B.

The auxiliary control valve 70C is operated by a first electromagnetic valve 73A and a second electromagnetic valve 73B. When the first electromagnetic valve 73A is opened, the pilot fluid is applied to one of the pressure-receiving portions of the auxiliary control valve 70C. In addition, when the second electromagnetic valve 73B is opened, the pilot fluid is applied to the other one of the pressure-receiving portions of the auxiliary control valve 70C.

Thus, when the pilot fluid applied to one of the pressure-receiving portions of the auxiliary control valve 70C or the other one of the pressure-receiving portions of the auxiliary control valve 70C, the auxiliary control valve 70C is switched. In this manner, the auxiliary actuator of the auxiliary attachment is operated by the operation fluid supplied from the auxiliary control valve 70C.

Meanwhile, the first electromagnetic valve 73A and the second electromagnetic valve 73B are operated by a second control device 82 descried below.

As shown in FIG. 1 and FIG. 2, the track loader (the work machine) 1 includes a control device used for a control of the work machine 1. The control device includes a first control device 81 and a second control device 82.

FIG. 1 and FIG. 2 show the second control device 82. The second control device 82 shown in FIG. 2 is similar to the second control device 82 shown in FIG. 2.

The first control device 81 is a control device for controlling the motor 29. In the embodiment, the motor 29 is an engine, and thus the first control device 81 is referred to as an engine control device. For convenience of the explanation, the motor 29 is equivalent to the engine in the explanation.

A setup member 83 is connected to the first control device 81. The setup member 83 is a device for setting (ordering) a target revolution speed of the engine (the motor) 29 (a target engine revolution speed). The setup member 83 includes a pedal 83a and a sensor 83b. The sensor 83b is configured to detect an extent of operation of the pedal 83a.

The pedal 83a is an acceleration lever swingably supported or an acceleration pedal swingably supported. The extent of operation detected by the sensor 83b is inputted to the first control device 81. An engine revolution speed corresponding to the extent of operation detected by the sensor 83b serves as the target revolution speed of the engine (the target engine revolution speed).

In other words, the target revolution speed of the engine is set (determined) on the basis of the extent of operation of the setup member 83. The engine 29 is controlled by the first control device 81 to revolve at the determined target revolution speed of the engine. In addition, a sensor 84 is connected to the first control device 81. The sensor 84 is configured to detect an actual engine revolution speed (referred to as a real revolution speed of the engine). The actual revolution speed of the engine is inputted to the first control device 81.

The engine control by the first control device 81 is in a commonly-known method. Thus, the first control device 81 outputs a control signal to an injector, the control signal indicating a fuel injection quantity, an injection timing, and a fuel injection rate, for example.

In addition, the first control device 81 outputs a signal to a supply pump and a common-rail, the signal indicating a fuel injection pressure and the like. That is, the first control device 81 controls an injector, the supply pump, and the common-rail to satisfy the actual revolution speed of the engine with the target revolution speed of the engine.

The second control device 82 is a control device for controlling the hydraulic system. The second control device 82 controls the first electromagnetic valve 73A and the second electromagnetic valve 73B. A switch 74 (refer to FIG. 2) is connected to the second control device 82. The switch 74 being disposed around the operator seat 8.

The switch 74 is constituted of a seesaw switch, a slide switch, or a push switch. The seesaw switch is configured to be swingable. The slide switch is configured to be slidable. The push switch is configured to be pushable. An operation extent of the switch 74 is inputted to the second control device 82.

The operation of the switch 74 opens and closes the first electromagnetic valve 73A and the second electromagnetic valve 73B. Thus, the auxiliary actuator is operated under a control by the second control device 82.

In addition, the second control device 82 includes a calculator 82a, a storage 82b, and a controller 82c. The calculator 82a, the storage 82b, and the controller 82c are constituted of a program, an electric/electronic circuit, an electric/electronic component, or the like each incorporated in the second control device 82. The second control device 82 is capable of obtaining both of the actual revolution speed of the engine and the target revolution speed of the engine from the first control device 81.

When a load is applied to the engine 29, the actual revolution speed of the engine decreases from the target revolution speed of the engine. A term "a dropping amount of engine" means the decreasing amount of the actual revolution speed from the target revolution speed (a difference between the target revolution speed of the engine and the actual revolution speed of the engine), the actual revolution speed being dropped when a load is applied to the engine 29.

The calculator 82a calculates the dropping amount of engine on the basis of the target revolution speed of engine and the actual revolution speed of engine, the target revolution speed being determined by the setup member 83, the actual revolution speed being detected by the sensor 84. In the embodiment, the controller 82c determined that a load is applied to the engine 29 when the actual revolution speed of engine decreases (drops) from the target revolution speed of engine.

The operation valve 45 is connected to the second control device 82. The operation valve 45 is capable of being controlled by the controller 82c, that is, the controller 82c is capable of changing the opening aperture of the operation valve 45. In particular, a command signal is outputted from the controller 82c to the solenoid of the operation valve 45, and the operation valve 45 changes the opening aperture due to the command signal. In this manner, the controller 82c is capable of changing the pressure of the operation fluid (the pilot pressure) that is outputted from the operation valve 45.

The storage 82b stores control characteristics (a first control characteristic L1 and a second control characteristic L2). The control characteristics are used for the control of the operation valve 45. The controller 82b controls the operation valve 45 in accordance with the control characteristics stored in the storage 82b.

When the engine revolution speed is dropped by a load applied to the work machine 1, an operator of the work machine 1 feels that the engine 29 is running well. Thus, when the engine revolution speed is not dropped by the load applied to the work machine 1, the operator may feel that the engine 29 is not running well (may feel something wrong).

On the other hand, when the engine revolution speed is dropped widely, the engine 29 may stall.

The second control device 82 provides a control to prevent the engine stall (referred to as an anti-stall control), giving the operator a feel of the dropping of the engine revolution speed (a feel of the operator sensing the dropping of the engine revolution speed). In addition, the second control device 82 changes the opening aperture of the operation valve 45 on the basis of the dropping amount of the engine, and thus provides the anti-stall control (prevents the engine stall).

Figure 3:
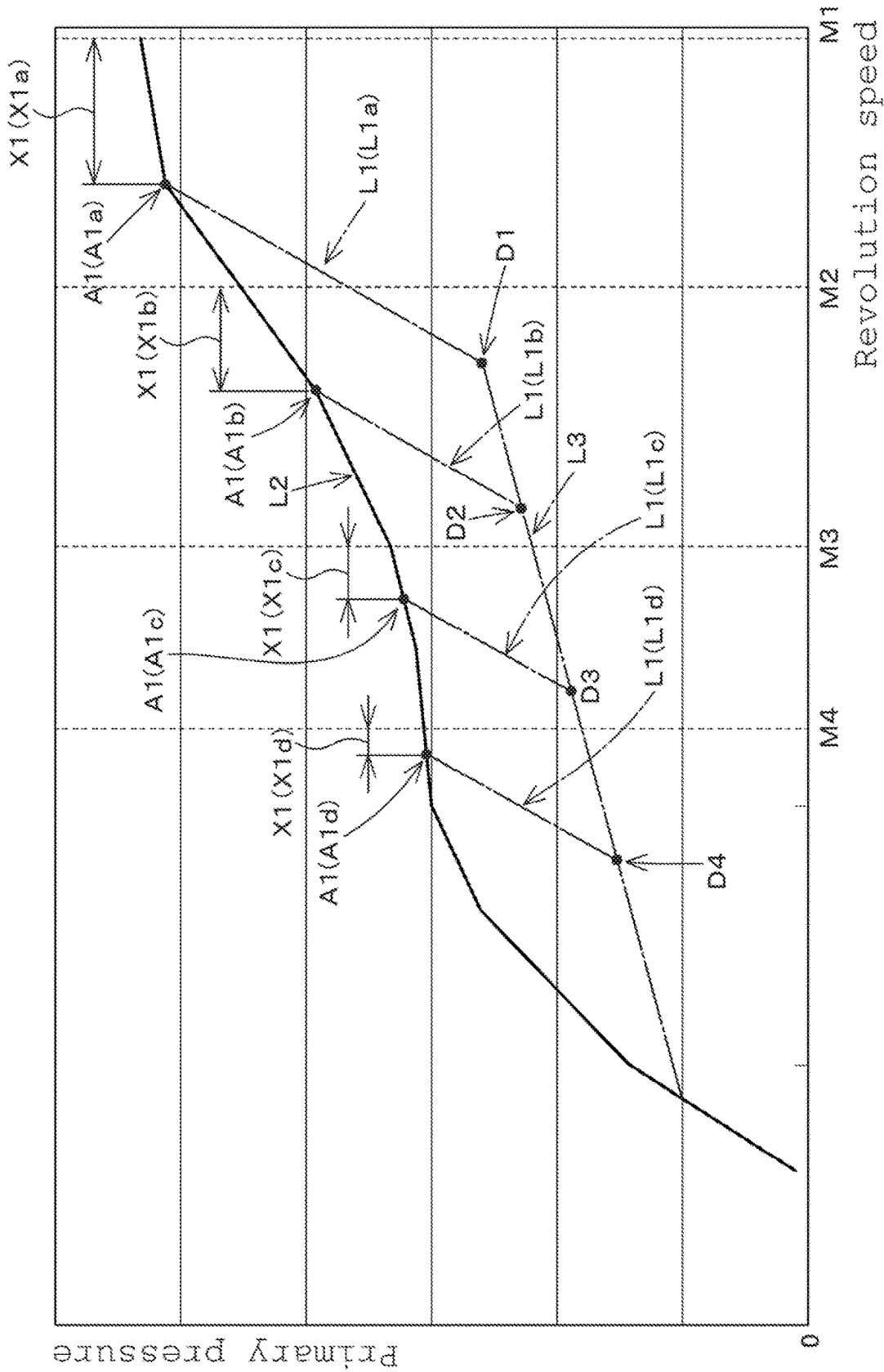
FIG. 3 is a view illustrating a relation between an engine revolution speed and a travel primary pressure according to the first embodiment, and illustrating a characteristic view for an anti-stall control according to the first embodiment.
Figure 4:
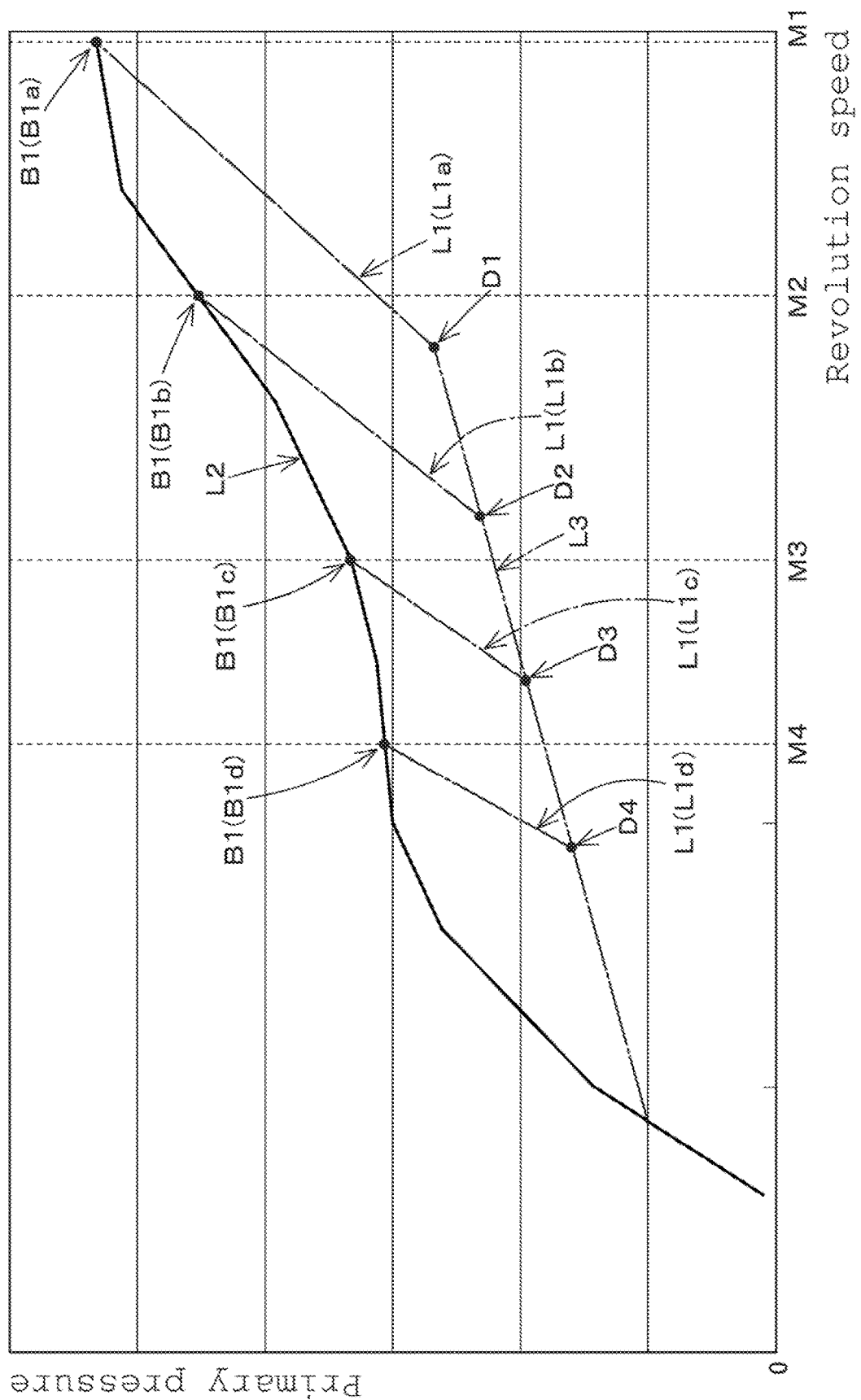
FIG. 4 is a view illustrating a relation between an engine revolution speed and a travel primary pressure according to a second embodiment of the present invention, and illustrating a characteristic view for an anti-stall control according to the second embodiment.

Referring to FIG. 3 and FIG. 4, the anti-stall control will be explained below.

FIG. 3 illustrates a characteristic view for the anti-stall control according to the first embodiment. FIG. 4 illustrates a characteristic view for the anti-stall control according to a second embodiment. FIG. 3 and FIG. 4 show a relation between the engine revolution speed, a travel primary pressure, a plurality of the first control characteristics L1, and the second control characteristic L2.

In FIG. 3 and FIG. 4, a horizontal axis shows the engine revolution speed (the actual revolution speed of engine), and the engine revolution speed increases toward the right side. A vertical axis shows the travel primary pressure, and the pressure increases toward the upper side.

The travel primary pressure is a pressure of the operation fluid in a fluid tube of the second supply-discharge tube 100c, the fluid tube extending from the operation valve 45 to the remote control valves (the remote control valves 36, 37, 38, and 39). In particular, the travel primary pressure is a pressure of the operation fluid (the pilot pressure) outputted from the operation valve 45, that is, a primary pressure of the operation fluid supplied to the remote control valves 36 to 39 that are disposed on the travel lever 40 used for the traveling operation.

Referring to FIG. 3, the anti-stall control according to the first embodiment will be explained first.

The plurality of first control characteristics L1 show relations between the travel primary pressure and the actual revolution speed of engine under a state where a predetermined load or more is applied to the engine 29 (under a state where the dropping amount of the engine is a predetermined revolution speed or more). The first control characteristics L1 are provided corresponding to the target revolution speeds of the engine. That is, the first control characteristic L1 is given to every target revolution speed of engine.

The second control characteristic L2 shows a relation between the travel primary pressure and the actual revolution speed of engine under a state where a load less than the predetermined load is applied to the engine 29 (under a state where the dropping amount of the engine is less than the predetermined revolution speed). The second control characteristic L2 is a characteristic line shared with all of the target revolution speeds of the engine. Thus, a singular of the second control characteristic L2 is given.

The storage 82a of the second control device 82 stores the plurality of first control characteristics L1 and the second control characteristic L2 (the storage 82a has data forming the first control characteristics L1 and the second control characteristic L2, control parameters such as functions, and the like).

The controller 82c of the second control device 82 has a judgement value for every target revolution speed (a dropping amount of the actual revolution speed from the target revolution speed), the judgement value being used for judging the dropping amount of engine. The controller 82c controls the operation valve 45 on the basis of the second control characteristic L2 in a case where the dropping amount of engine is less than a predetermined judgement value.

In particular, when the dropping amount of the engine is less than a predetermined value, the controller 82c adjusts the opening aperture of the proportional valve 45 such that the relation between the actual revolution speed of engine and the travel primary pressure satisfies the second control characteristic L2 (the controller 82c adjusts the opening aperture of the operation valve 45 such that the travel primary pressure is outputted from the operation valve 45, the travel primary pressure corresponding to the actual revolution speed determined by the second control characteristic L2).

In addition, when the dropping amount of the engine is equal to or more than the judgement value preliminarily determined, the controller 82c controls the operation valve 45 on the basis of the first control characteristic L1 corresponding to the target revolution speed set by the setup member 83 (switching from the second control characteristic L2 to the first control characteristic L1).

In this manner, when the dropping amount of the engine is more than a predetermined value, the controller 82c adjusts the opening aperture of the proportional valve 45 such that the relation between the actual revolution speed of engine and the travel primary pressure satisfies the first control characteristic L1 (the controller 82c adjusts the opening aperture of the operation valve 45 such that the travel primary pressure is outputted from the operation valve 45, the travel primary pressure corresponding to the actual revolution speed determined by the first control characteristic L1).

FIG. 3 (the first embodiment) exemplifies four control characteristics as the plurality of first control characteristics L1, that is, a first control characteristic L1a, a first control characteristic L1b, a first control characteristic L1c, and a first control characteristic L1d.

The first control characteristic L1a is employed when the target revolution speed is M1 rpm (revolutions per minute). The M1 is a numerical number. The first control characteristic L1b is employed when the target revolution speed is M2 rpm being lower than M1 rpm. The M2 is a numerical number. The first control characteristic L1c is employed when the target revolution speed is M3 rpm being lower than M2 rpm. The M3 is a numerical number. The first control characteristic L1d is employed when the target revolution speed is M4 rpm being lower than M3 rpm. The M4 is a numerical number.

The first control characteristic L1a, the first control characteristic L1b, the first control characteristic L1c, and the first control characteristic L1d will be explained below in detail.

Each of the first control characteristic L1a, the first control characteristic L1b, the first control characteristic L1c, and the first control characteristic L1d is formed of a substantially-straight line and has an identical slope.

The first control characteristic L1a is a characteristic line that drops the travel primary pressure in accordance with the dropping of the engine revolution speed from a point A1a included on the second control characteristic L2. The point A1a is a point that indicates the actual revolution speed dropping from the target revolution speed M1 rpm by a dropping amount X1a (a point included on the second control characteristic L2 determined when the dropping amount from the target revolution speed M1 rpm is equal to X1a).

The first control characteristic L1b a characteristic line that drops the travel primary pressure in accordance with the dropping of the engine revolution speed from a point A1b included on the second control characteristic L2. The point A1b is a point that indicates the actual revolution speed dropping from the target revolution speed M2 rpm by a dropping amount X1b.

The first control characteristic L1c a characteristic line that drops the travel primary pressure in accordance with the dropping of the engine revolution speed from a point A1c included on the second control characteristic L2. The point A1c is a point that indicates the actual revolution speed dropping from the target revolution speed M3 rpm by a dropping amount X1c.

The first control characteristic L1d a characteristic line that drops the travel primary pressure in accordance with the dropping of the engine revolution speed from a point A1d included on the second control characteristic L2. The point A1d is a point that indicates the actual revolution speed dropping from the target revolution speed M4 rpm by a dropping amount X1d.

The dropping amount X1b has a value smaller than a value of the dropping amount X1a. In addition, the dropping amount X1c has a value smaller than a value of the dropping amount X1b. And, the dropping amount X1d has a value smaller than a value of the dropping amount X1c.

For example, a value 300 rpm of the dropping amount X1 is the judgement value for switching the second control characteristic L2 to the first control characteristic L1 when the target revolution speed of engine is 2800 rpm. In addition, the judgement value is 200 rpm when the target revolution speed of engine is 2600 rpm, the judgement value is 100 rpm when the target revolution speed of engine is 2400 rpm, and the judgement value is 50 rpm when the target revolution speed of engine is 2300 rpm or less. In a case where a plurality of judgement values are employed, the smallest judgement value may be zero.

Thus, the drop amount X1 is set to be larger in accordance with the increasing of the target revolution speed of engine, the drop amount X1 being employed for switching the second control characteristic L2 to the first control characteristic L1.

In other words, the controller 82c has the judgement values that are set to be larger in accordance with the increasing of the target revolution speed of engine. The controller 82c controls the operation valve 45 with use of the judgement values that are set to be larger in accordance with the increasing of the target revolution speed of engine.

The first control characteristic L1a, the first control characteristic L1b, the first control characteristic L1c, and the first control characteristic L1d are leading to a third characteristic.

The third control characteristic L3 is a characteristic line that drops the travel primary pressure in accordance with the dropping of the engine revolution speed, and is a characteristic line having a substantially-straight line. A slope of the third characteristic is smaller than the slopes of the first control characteristic lines L1 (the first control characteristic L1a, the first control characteristic L1b, the first control characteristic L1c, and the first control characteristic L1d).

A relation between the first control characteristic L1 and the third control characteristic L3 will be explained next.

The first control characteristic L1a is leading to a third control characteristic L3 at a first revolution speed D1 that is a predetermined value of the actual revolution speed of engine. The first control characteristic L1b is leading to the third control characteristic L3 at a second revolution speed D2 that is the actual revolution speed of engine being lower than the first revolution speed D1.

The first control characteristic L1c is leading to the third control characteristic L3 at a third revolution speed D3 that is the actual revolution speed of engine being lower than the second revolution speed D2. The first control characteristic L1d is leading to the third control characteristic L3 at a fourth revolution speed D4 that is the actual revolution speed of engine being lower than the third revolution speed D3.

The third control characteristic L3 is lead to and shared with the first control characteristic L1a, the first control characteristic L1b, the first control characteristic L1c, and the first control characteristic L1d.

The control by the controller 82c will be explained below.

As shown in FIG. 3, in a case where the load of the engine 29 is less than a predetermined load, that is, a case where the actual revolution speed of engine is not dropped from the target revolution speed by the predetermined dropping amount, the controller 82c controls the opening aperture of the operation valve 45 such that the pressure outputted from the operation valve 45 (the pressures of the operation fluids supplied to the remote control valves 36 to 39) corresponds to the actual revolution speed of engine indicated by the second control characteristic L2.

Meanwhile, the controller 82c switches the second control characteristic L2 to the first control characteristic L1a when the target revolution speed of engine is M1 and the actual revolution speed of engine is decreased by the dropping amount X1a or more from the target revolution speed M1 (that is, the actual revolution speed of engine is below the point A1a).

Then, the controller 82c controls the opening aperture of the operation valve 45 such that the pressure outputted from the operation valve 45 corresponds to the actual revolution speed of engine indicated by the first control characteristic L1a. In addition, the controller 82c controls the operation valve 45 in accordance with the third control characteristic L3 when the actual revolution speed of engine is less than a first revolution speed D1 during the controlling of the operation valve 45 under the first control characteristic L1a.

The controller 82c switches the second control characteristic L2 to the first control characteristic L1b when the target revolution speed of engine is M2 and the actual revolution speed of engine is decreased by the dropping amount X1b or more from the target revolution speed M2 (that is, the actual revolution speed of engine is below the point A1b).

Then, the controller 82c controls the opening aperture of the operation valve 45 such that the pressure outputted from the operation valve 45 corresponds to the actual revolution speed of engine indicated by the first control characteristic L1b. In addition, the controller 82c controls the operation valve 45 in accordance with the third control characteristic L3 when the actual revolution speed of engine is less than a second revolution speed D2 during the controlling of the operation valve 45 under the first control characteristic L1b.

The controller 82c switches the second control characteristic L2 to the first control characteristic L1c when the target revolution speed of engine is M3 and the actual revolution speed of engine is decreased by the dropping amount X1c or more from the target revolution speed M3 (that is, the actual revolution speed of engine is below the point A1c).

Then, the controller 82c controls the opening aperture of the operation valve 45 such that the pressure outputted from the operation valve 45 corresponds to the actual revolution speed of engine indicated by the first control characteristic L1c. In addition, the controller 82c controls the operation valve 45 in accordance with the third control characteristic L3 when the actual revolution speed of engine is equal to or less than a third revolution speed D3 during the controlling of the operation valve 45 under the first control characteristic L1c.

The controller 82c switches the second control characteristic L2 to the first control characteristic L1d when the target revolution speed of engine is M4 and the actual revolution speed of engine is decreased by the dropping amount X1d or more from the target revolution speed M4 (that is, the actual revolution speed of engine is below the point A1d).

Then, the controller 82c controls the opening aperture of the operation valve 45 such that the pressure outputted from the operation valve 45 corresponds to the actual revolution speed of engine indicated by the first control characteristic L1d. In addition, the controller 82c controls the operation valve 45 in accordance with the third control characteristic L3 when the actual revolution speed of engine is equal to or less than a fourth revolution speed D4 during the controlling of the operation valve 45 under the first control characteristic L1d.

As described above, the second control characteristic L2 has a decreasing degree of the travel primary pressure 1 decreasing in accordance with the decreasing of the actual revolution speed of engine, the decreasing degree being smaller than a lowering degree of the first control characteristic L1. Thus, the second control characteristic L2 provides a small suppressing force to the decreasing of the actual revolution speed of engine when a load is applied to the engine 29 (that is, the actual revolution speed of engine is decreased corresponding to and in accordance with the load).

In this manner, the operator feels the dropping of the engine revolution speed when a load is applied to the engine 29 (feels that the engine 29 works well).

In addition, the travel primary pressure corresponding to a predetermined engine revolution speed under the first control characteristic L1 is lower than the travel primary pressure of the second control characteristic L2. That is, the travel primary pressure of the first control characteristic L1 is lower than the travel primary pressure of the second control characteristic L2 at an identical engine revolution speed.

Thus, compared to the control based on the second control characteristic L2, the pressure of the operation fluid (the pilot pressure) inputted to the remote control valves is suppressed to be lower under the control based on the first control characteristic L1. An angle of the swash plate of the travel pump (the travel hydraulic pump) 66 is adjusted by the operation fluid suppressed to have a low pressure, and thereby the load applied to the engine 29 is effectively reduced. In this manner, the engine revolution speed can be effectively prevented from decreasing (the engine revolution speed can be held to be higher than the engine revolution speed that is obtained under the control based on the second control characteristic L2).

Thus, the engine stall is prevented efficiently in a case where a load applied to the engine 29 is increased to be a predetermined load or more to significantly decrease the engine revolution speed.

As described above, the feeling given to the operator can be improved under the loading to the engine 29, and further the engine stall can be prevented also under the loading to the engine 29.

In addition, a possibility of the engine stall caused in accordance with the dropping of the engine revolution speed becomes high in accordance with reduction of the target revolution speed if the dropping amount is employed at the high target revolution speed in a case where the dropping amount is constant to all of the target revolution speeds, the dropping amount being set for switching the second control characteristic L2 to the first control characteristic L1.

On the other hand, the dropping amount X1 of the high target revolution speed becomes smaller than the dropping amount X1 of the low target revolution speed in the first embodiment, the dropping amount X1 being set for switching the second control characteristic L2 to the first control characteristic L1. In this manner, the feeling given to the operator and the engine stall both can be prevented in every target revolution speeds of engine.

The relation between the target revolution speed of engine and the dropping amount X1 may be a proportional relation where the dropping amount X1 proportionally increases in accordance with a sequential or stepping increasing of the target revolution speed of engine. And, the relation between the target revolution speed of engine and the dropping amount X1 may be a relation having a threshold value is given to each of the target revolution speeds where the dropping amount is changed based on the threshold value (the dropping amount smaller than the threshold value is different from the dropping amount larger than the threshold value).

On the other hand, when the actual revolution speed of engine is dropped below the first revolution speed D1 to the fourth revolution speed D4, the controller 82c controls the pressure of the operation fluid supplied to the remote control valves 36 to 39 in accordance with the third control characteristic L3.

For example, the actual revolution speed of engine drops significantly when the work machine 1 moving forward strikes the bucket 11 to piled earth and sand and the like. If the slope of the first control characteristic L1 is large (a dropping amount of the travel primary pressure is significant with respect to the dropping amount), a torque of the engine 29 is short when the actual revolution speed of engine is dropped significantly, and accordingly the real engine revolution speed is hard to be recovered quickly.

Thus, the slope of the third control characteristic L3 is milder than the slope of the first control characteristic L1 (reducing the decreasing amount of the travel primary pressure with respect to the dropping amount), the third control characteristic L3 corresponding to a region where the dropping amount in the first control characteristic L1 is significant. In this manner, the actual revolution speed of engine is recovered easily after the significant dropping of the engine revolution speed, and the work machine 1 is capable of rapidly moving backward after the striking of the bucket 11 to the piled earth and sand and the like.

In addition, the dropping amount X1 may be switched by an operator's operation. That is, another pattern of the first control characteristic is stored in the storage 82b. The another pattern is different from the pattern of the first control characteristic L1 exemplified in FIG. 3, and has a dropping amount different from the dropping amount X1 (a value larger or smaller than the value of the dropping amount X1 shown in FIG. 3).

As shown in FIG. 1, the work machine 1 is provided with a switch 110 connected to the second control device 82, and the switch 110 is arranged on a portion accessible from the operator (for example, around the operator seat 8). The switch 110 switches the first control characteristic between the pattern shown in FIG. 3 and the another pattern.

In this manner, the operator can choose the first control characteristic having a pattern suitable to an operation state. The first control characteristic is switchable, and may has two patterns, and three or more patterns.

The work machine 1 is provided with another switch 111 (referred to as a setup switch 111) connected to the second control device 82, and the setup switch 111 is arranged around the operator seat 8. The setup switch 111 is capable of setting the judgment value arbitrarily.

In addition, the patterns of the first characteristic may be automatically switched by the switching of the speed (traveling speed) of the travel motor 57 (switching between the first speed and the second speed). For example, the switch 110 is constituted of a switch valve configured to be switched by the pilot pressure, the pilot pressure being supplied for switching the first hydraulic switch valve 63.

Then, the patterns of the first control characteristic is automatically switched in synchronization with the switching of the first hydraulic valve 63. The patterns of the first control characteristic may be automatically switched based on the switching of the speed of the travel motor 57 having a speed-changing pattern of three speeds or more.

In addition, the pattern of the first control characteristic may be automatically switched based on a type of the attachment actually attached. The attachment may be configured to be automatically identified by a sensor after being attached to the work machine 1. In addition, the operator may select and switch the pattern of the first control characteristic on the basis of the attachment to be attached to the work machine 1.

The operator of the work machine 1 feels that the engine 29 is running well because the revolution speed of engine drops under the load applied to the work machine 1. Thus, if the revolution speed of engine does not drop under the load applied to the work machine 1, the operator may feel that the engine 29 is not running well.

However, without preventing the dropping of the revolution speed of engine, the engine may stall when the revolution speed of engine is dropped significantly by the load applied to the work machine 1.

The embodiment described above provides a hydraulic system for a work machine, the hydraulic system being capable of improving the feeling given to an operator under a load applied to a motor, and further an engine stall can be prevented also under the load applied to the motor.

Second Embodiment

FIG. 4 is a view illustrating a relation an engine revolution speed and a travel primary pressure according to a second embodiment of the present invention. In the second embodiment, configurations different from the first embodiment will be explained, and explanations of the configurations similar to the first embodiment will be omitted.

An outline of the second embodiment will be explained first.

The second embodiment employs a plurality of first control characteristics L1 determined corresponding to the target revolution speeds of engine, the plurality of first control characteristics L1 each having sloes different from each other. The storage 82*b* stores the plurality of first control characteristics L1 each having different slopes.

When a load applied to the engine 29 is a predetermined value or more, the controller 82*c* controls the operation valve 45 in accordance with the plurality of first control characteristics L1 each having different slopes. The plurality of first control characteristics L1 are determined so as to correspond to the target revolution speeds of engine.

The higher the target revolution speeds of engine are, the milder the slopes of the first control characteristics L1 are set. The operation valve 45 is controlled with used of the first control characteristics L1 having the slopes being milder in accordance with the increment of the target revolution speeds of engine.

The first control characteristics L1 according to the second embodiment will be explained in detail below.

As shown in FIG. 4, the first control characteristic L1*a* is a characteristic line that drops the travel primary pressure from a point B1*a* in accordance with the decreasing of the engine revolution speed, the point B1*a* being on the second control characteristic L2. The point B1*a* is a point being on the second control characteristic L2, and is a point corresponding to the target revolution speed M1.

The first control characteristic L1*b* is a characteristic line that drops the travel primary pressure from a point B1*b* in accordance with the decreasing of the engine revolution speed, the point B1*b* being on the second control characteristic L2. The point B1*b* is a point being on the second control characteristic L2, and is a point corresponding to the target revolution speed M2.

The first control characteristic L1*c* is a characteristic line that drops the travel primary pressure from a point B1*c* in accordance with the decreasing of the engine revolution speed, the point B1*c* being on the second control characteristic L2. The point B1*c* is a point being on the second control characteristic L2, and is a point corresponding to the target revolution speed M3.

The first control characteristic L1*d* is a characteristic line that drops the travel primary pressure from a point B1*d* in accordance with the decreasing of the engine revolution speed, the point B1*d* being on the second control characteristic L2. The point B1*d* is a point being on the second control characteristic L2, and is a point corresponding to the target revolution speed M4.

The engine is stalled due to the decreasing of the actual revolution speed of engine. And, the engine is stalled at a small dropping amount when the target revolution speed is low (the engine is stalled at the small dropping amount rather in the low target revolution speed in comparison with in the high target revolution speed).

In a case where all of the first control characteristics have identical slopes at all of the target revolution speeds of engine as in the conventional technique, it may be difficult for the engine to be prevented from stalling at the low target revolution speed when the slopes of the first control characteristics are set to give an operator a dropping feel at the high target revolution speed and to prevent the engine stall.

On the centrally, it may be difficult to give the operator the dropping feel at the high target revolution speed when the slopes of the first control characteristics are set to give the operator the dropping feel at the low target revolution speed and to prevent the engine stall.

Thus, the slopes of the first control characteristics L1 are set to be milder (easier) in accordance with the increment of the target revolution speeds of engine. The operation valve 45 is controlled with use of the first control characteristics L1 having the slopes being milder in accordance with the increment of the target revolution speeds of engine.

In this manner, the feeling given to the operator can be improved under the load applied to the engine 29, and further the engine stall can be prevented also under the load applied to the engine 29.

The relation between the target revolution speed of engine and the first control characteristic L1 may be a proportional relation where the slope of the first control characteristic L1 is increased proportionally in accordance with a sequential or stepping increasing of the target revolution speed of engine.

And, the relation between the target revolution speed of engine and the first control characteristic L1 may be a relation having a threshold value given to each of the target revolution speeds of engine and the slope of the first control characteristic L1 is changed based on the threshold value (the slope of the first control characteristic L1 above the threshold value is different from the slope of the first control characteristic L1 under the threshold value).

In addition, the slope of the first control characteristic L1 may be switched by an operator's operation. That is, another pattern of the first control characteristic is stored in the storage 82b. The another pattern is different from the pattern of the first control characteristic L1 exemplified in FIG. 4, and has a slope different from the slope of the first control characteristic L1 exemplified in FIG. 4 (a slope harder or milder than the slope of the first control characteristic L1 exemplified in FIG. 4).

The switch 110 switches the first control characteristic between the pattern shown in FIG. 4 and the another pattern. In this manner, the operator can choose the first control characteristic having a pattern suitable to an operation state. The first control characteristic is switchable, and may has two patterns, and three or more patterns.

In addition, the patterns of the first characteristic may be automatically switched by the switching of the speed of the travel motor 57 as in the first embodiment.

In addition, the pattern of the first control characteristic may be automatically switched based on a type of the attachment actually attached as in the first embodiment.

In the embodiment described above, the travel pump 66 is exemplified as the hydraulic device. However, the hydraulic device may be any types of hydraulic devices capable of being operated by the operation fluid outputted from the operation valve 45.

In addition, the control may be carried out using a combination of the first control characteristics having identical slopes shown in FIG. 3 and the first control characteristics having different slopes shown in FIG. 4.

The storage 82b stores the first control characteristics (the first control characteristics shown in FIG. 3) and the first control characteristics (the first control characteristics shown in FIG. 4). The first control characteristics shown in FIG. 3 have slopes parallel to each other. The first control characteristics shown in FIG. 4 have slopes different from each other with respect to the parallel slopes of the first control characteristics.

That is, the storage 82b stores both of the first control characteristics shown in FIG. 3 and the first control characteristics shown in FIG. 4.

The controller 82c controls the operation valve 45 in accordance with the second control characteristics when the dropping amount of the actual revolution speed from the target revolution speed is less than the judgement value. In addition, the controller 82c controls the operation valve 45 in accordance with the first control characteristics determined based on the target revolution speed (in accordance with the first control characteristics having the identical and parallel slopes or the first control characteristics having the different slopes) when the dropping amount of the actual revolution speed from the target revolution speed is equal to or more than the judgement value.

The operation valve 45 is controlled by the controller 82c in the similar manner described in the embodiment mentioned above.

In addition, the operation valve 45 is a valve for supplying the travel primary pressure to the travel operation device 25, the travel operation device 25 being configured to operate the travel pump 66. However, the operation valve 45 is not limited to the valve mentioned above. For example, the operation valve 45 may be constituted of an electromagnetic proportional valve configured to supply the operation fluid for controlling (a servo pressure) to a servo regulator. The servo regulator is configured to control the swash plate of the travel pump 66.

In that case, the operation valve (the electromagnetic proportional valve) is operated in synchronization with the operation of the travel lever 40 of the travel operation device 25. When the travel lever 40 is at the neutral position without being operated for example, the output of the operation valve is zero.

In addition, when the travel lever 40 is operated to the maximum extent (the maximum operation), the operation valve outputs a pressure corresponding to the travel primary pressure as shown in FIG. 3 and FIG. 4. The operation valve outputs the pressure corresponding to the travel primary pressure and to the operation amount of the travel lever. For example, when the travel primary pressure is 2.5 MPa, the operation valve outputs values proportionally allocated to the operation amount (0% to 100%) of the travel lever 40, the values being given by evenly dividing the 2.5 MPa.

In that case, when the operation amount of the travel lever 40 is the maximum (100%), the operation valve outputs 2.5 MPa corresponding to the maximum operation (the maximum extent). When the operation amount of the travel lever 40 is the half (50%), the operation valve outputs 1.25 MPa corresponding to the half operation (the half extent). When the travel primary pressure is 1.0 MPa, the operation valve outputs values proportionally allocated to the operation amount (0% to 100%) of the travel lever 40, the values being given by evenly dividing the 1.0 MPa.

Meanwhile, the travel primary pressure corresponding to the maximum operation extent of travel lever 40 is preliminarily set, and then the travel primary pressure is allocated to an extent from the maximum operation extent to the minimum operation extent (the relation between the operation extent and the travel primary pressure provides a constant slope). And, when the travel primary pressure obtained by the operation of the operation lever 40 does not exceed the travel primary pressure corresponding to the actual revolution speed of engine regardless of the operation of the travel lever 40, the travel primary pressure obtained by the operation extent of the operation lever 40 is employed.

On the other hand, when the travel primary pressure obtained by the operation of the operation lever 40 exceeds the travel primary pressure corresponding to the actual revolution speed of engine, the travel primary pressure corresponding to the actual revolution speed of engine is employed. That is, the relation between the travel primary pressure and the operation extent of the travel lever 40 is preliminarily set, and the control is carried out so as not to exceed the travel primary pressure based on the operation extent.

In the case where the travel primary pressure is allocated to the operation extent of the travel lever 40, the travel primary pressure may be allocated in consideration of play of the travel lever 40. In addition, the travel primary pressure may be allocated not proportionally with respect to the operation extent of the travel lever 40. In addition, the relation between the travel primary pressure and the travel lever 40 may be non-proportional.

When the engine revolution speed is dropped by a load applied to the work machine 1, an operator of the work machine 1 feels that the engine 29 is running well. Thus, when the engine revolution speed is not dropped by the load applied to the work machine 1, the operator may feel that the engine 29 is not running well (may feel something wrong).

On the other hand, when the engine revolution speed is dropped widely by the load applied to the work machine, the engine 29 may stall if the dropping of the revolution speed of engine is not prevented.

The embodiment described above provides a hydraulic system for a work machine, the hydraulic system being capable of improving the feeling given to an operator under a load applied to a motor, and further an engine stall can be prevented also under the load applied to the motor.

Third Embodiment

Figure 5:
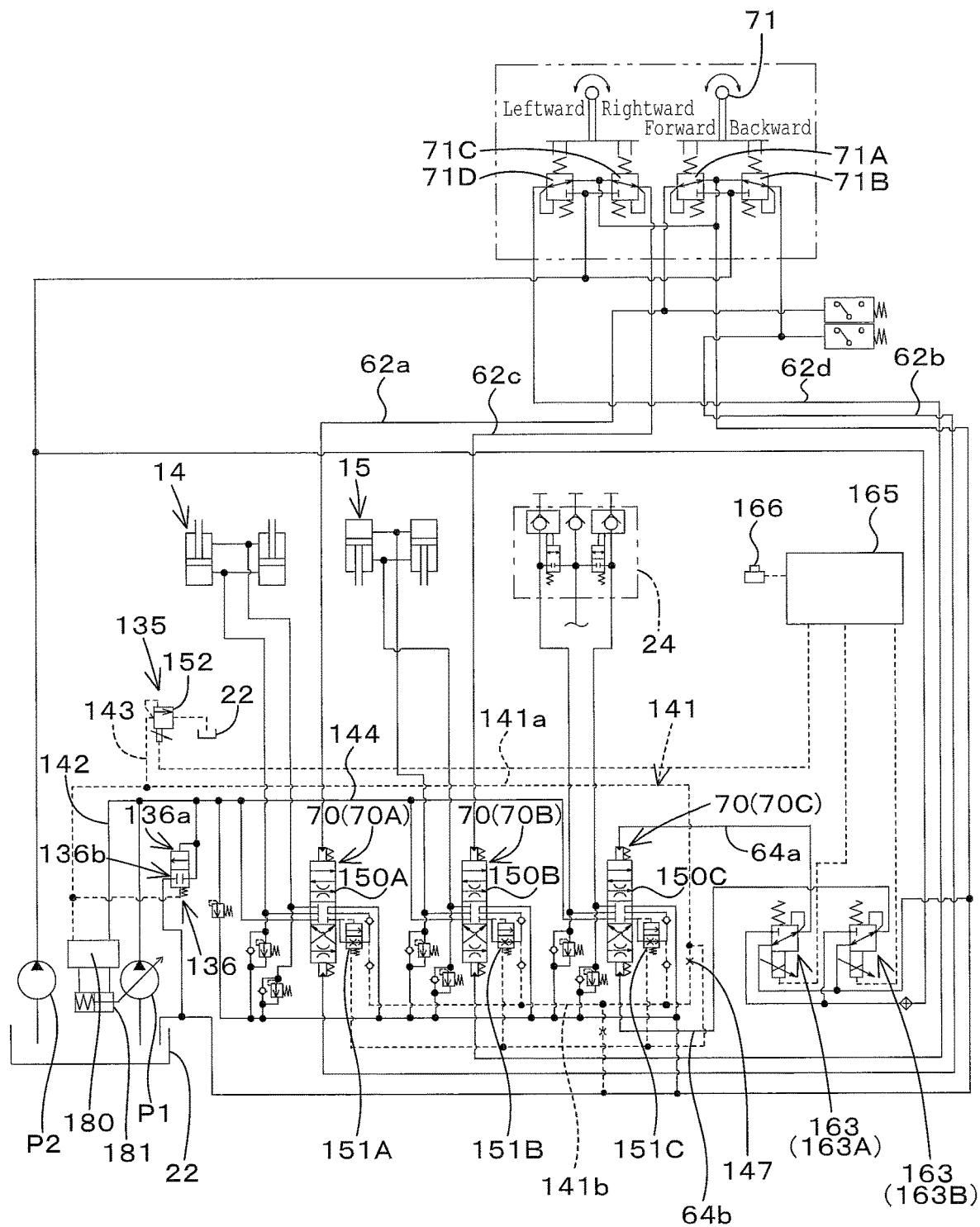
FIG. 5 is a schematic view illustrating a hydraulic system for operating according to a third embodiment of the present invention, the hydraulic system being included in a work machine.

FIG. 5 shows a hydraulic system for a work machine according to a third embodiment of the present invention. In the third embodiment, configurations different from the embodiments described above will be explained, and explanations of the configurations similar to the embodiments described above will be omitted.

The first hydraulic pump P1 is constituted of a variable displacement axial pump having a swash plate (a variable displacement pump). The second hydraulic pump P2 is constituted of a constant displacement pump. A fluid tube (a fluid path) 144 is disposed on the first hydraulic pump P1. The fluid tube 144 is configured to flow the operation fluid. A plurality of control valves 70 are connected to the fluid tube 144. The plurality of control valves 70 are configured to control the hydraulic actuator. The hydraulic actuator is a device configured to be operated by the operation fluid, and for example is a hydraulic cylinder, a hydraulic motor, or the like.

The plurality of control valves 70 include a first control valve 70A, a second control valve 70B, and a third control valve 70C. The first control valve 70A is a valve for controlling the hydraulic cylinder (the boom cylinder) 14 configured to operate the boom 10.

The second control valve 70B is a valve for controlling a hydraulic cylinder (a bucket cylinder) 15 configured to operate the bucket 11. The third control valve 70C is a valve for controlling a hydraulic device (the hydraulic cylinder or the hydraulic motor) attached to an auxiliary attachment such as a hydraulic crusher, a hydraulic breaker, an angle broom, an earth auger, a pallet fork, a sweeper, a mower, a snow blower, and the like.

The first control valve 70A includes a direction switch valve 150A and the pressure compensation valve 151A. The direction switch valve 150A is a three-position switch valve having a direct operated spool capable of being switched to a neutral position, to a first position, and to a second position. The boom cylinder 14 is connected to the direction switch valve 150A by a fluid tube. The direction switch valve 150A is connected to the pressure compensation valve 151A by a fluid tube.

The pressure compensation valve 151A is a valve for maintaining an anteroposterior differential pressure of the differential switch valve 150A (an anteroposterior differential pressure of the spool) to be constant. The operation fluid outputted from the direction switch valve 150A passes through the direction switch valve 150A and reaches the boom cylinder 14.

The second control valve 70B includes a direction switch valve 150B and a pressure compensation valve 151B. The direction switch valve 150B is a three-position switch valve having a direct-acting spool that is configured to be switched to three positions, a neutral position, a first position, and a second position. The bucket cylinder 15 is connected to the direction switch valve 150B by a fluid tube. The direction switch valve 150B and the pressure compensation valve 151B are connected to each other by a fluid tube.

The pressure compensation valve 151B is a valve for maintaining an anteroposterior differential pressure of the differential switch valve 150B (an anteroposterior differential pressure of the spool) to be constant. The operation fluid outputted from the direction switch valve 150B passes through the direction switch valve 150B and reaches the boom cylinder 15.

The third control valve 70C includes a direction switch valve 150C and a pressure compensation valve 151C. The direction switch valve 150C is a three-position switch valve having a direct-acting spool that is configured to be switched to three positions, a neutral position, a first position, and a second position. The hydraulic device of the auxiliary attachment is connected to the direction switch valve 150C by a fluid tube and the connecting portion 24. The direction switch valve 150C and the pressure compensation valve 151C are connected to each other by a fluid tube.

The pressure compensation valve 151C is a valve for maintaining an anteroposterior differential pressure of the differential switch valve 150C (an anteroposterior differential pressure of the spool) to be constant. The operation fluid outputted from the direction switch valve 150C passes through the direction switch valve 150C and reaches the hydraulic device of the auxiliary attachment.

The remote control valve 72A is connected to one of pressure-receiving portions of the direction switch valve 150A by a fluid tube 62a. The remote control valve 72B is connected to the other one of the pressure-receiving portions of the direction switch valve 150A by a fluid tube 62b. The remote control valve 72C is connected to one of pressure-receiving portions of the direction switch valve 150B by a fluid tube 62c. The remote control valve 72D is connected to the other one of the pressure-receiving portions of the direction switch valve 150B by a fluid tube 62d.

When the operation member 71 is tilted forward, the direction switch valve 150A is switched, and thus the boom cylinder 14 is shortened to move the boom 10 downward. When the operation member 71 is tilted backward, the direction switch valve 150A is switched, and thus the boom cylinder 14 is stretched to move the boom 10 upward.

When the operation member 71 is tilted rightward, the direction switch valve 150B is switched, and thus the bucket cylinder 15 is stretched to move the bucket 11 in the dumping movement. When the operation member 71 is tilted leftward, the direction switch valve 150B is switched, and thus the bucket cylinder 15 is shortened to move the bucket 11 in the shoveling movement.

The hydraulic device of the auxiliary actuator is operated by a plurality of proportional valve 163. The proportional valve 163 is an electromagnetic valve configured to change the opening aperture due to the magnetization.

The plurality of proportional valves 163 include a first proportional valve 163A and a second proportional valve 163B. The operation fluid from the second hydraulic pump P2 is supplied to the first proportional valve 163 and the second proportional valve 163B. The first proportional valve 163A is connected to one of pressure-receiving portions of the direction switch valve 150 by a fluid tube (a fluid path) 64a.

The control device 165 is configured to magnetize the proportional valves 163 (the first proportional valve 163A and the second proportional valve 163B).

The control device 165 is constituted of an CPU and the like. The operation member 166 is connected to the control device 165. An operation extent (an operation amount such a slide amount, a swing amount, and the like) of the operation member 166 is inputted to the control device 165. The operation member 166 is constituted of a seesaw switch, a slide switch, or a push switch. The seesaw switch is configured to be swingable. The slide switch is configured to be slidable.

When the operation member 166 is operated toward a direction, the control device 165 magnetizes a solenoid of the first proportional valve 163A. The first proportional valve 163A is opened by the magnetization of the solenoid, and thus a predetermined pilot pressure is applied to the other one of the pressure-receiving portions of the direction switch valve 150.

The pilot pressure is applied to the direction switch valve 150, and thus the direction switch valve 150 is switched. In this manner, the operation fluid outputted from the first hydraulic pump P1 is applied to the hydraulic device of the auxiliary actuator. In addition, when the operation member 166 is operated toward another direction, the control device 165 magnetizes a solenoid of the second proportional valve 163B.

The second proportional valve 163B is opened by the magnetization of the solenoid, and thus a predetermined pilot pressure is applied to the other one of the pressure-receiving portions of the direction switch valve 150. The pilot pressure is applied to the direction switch valve 150, and thus the direction switch valve 150 is switched. In this manner, the operation fluid outputted from the first hydraulic pump P1 is applied to the hydraulic device of the auxiliary actuator.

As described above, the boom 10 can be operated by the first control valve 70A (the direction switch valve 150A). The bucket 11 can be operated by the second control valve 70B (the direction switch valve 150B). The auxiliary actuator can be operated by the third control valve 70C (the direction switch valve 150C).

The hydraulic system for the work machine includes a load sensing system. The load sensing system controls the first hydraulic pump P1 (controls an output rate of the first hydraulic pump P1) such that a differential pressure can be constant, the differential pressure being generated between the highest load pressure generated in the operation of the hydraulic actuator and an output pressure of the first hydraulic pump P1.

The load sensing system will be explained below. The load sensing system includes a first fluid tube 141, a second fluid tube 142, a flow rate compensation valve 180, and a swash plate controller 181.

The plurality of control valves are connected to the first fluid tube 141 (also referred to as a PLS fluid tube). The first fluid tube 141 is a fluid tube to which the highest load pressure can be applied, the highest load pressure being generated in the operation of the plurality of control valves 70.

The first fluid tube 141 is provided with a throttle 147. The first fluid tube 141 is provided with a check valve for detecting the highest load pressure from the plurality of control valves (sections). In the embodiment, the first fluid tube 141 is provided with the check valve. However, the first fluid tube 141 may be provided with a high-pressure selective valve. s A pressure compensation valve 151A, a pressure compensation valve 151B, and a pressure compensation valve 151C are connected to the first fluid tube 141. The pressure compensation valve 151A is included in the first control valve 70A. The pressure compensation valve 151B is included in the first control valve 70B. The pressure compensation valve 151C is included in the first control valve 70C.

The hydraulic system according to the embodiment employs an after-orifice type where the pressure compensation valve is connected after the spool of the control valve 70. However, the hydraulic system according to the embodiment may employ a before-orifice type where the pressure compensation valve is connected before the spool of the control valve 70.

The highest load pressure (a PLS signal pressure that is the highest one of the load pressures of the plurality of control valves 70) of following three load pressures is applied to the first fluid tube 141. First one of the three load pressures is the load pressure of the boom cylinder 14 corresponding to the first control valve 70A. First one of the three load pressures is the load pressure of the boom cylinder 14 corresponding to the first control valve 70A. Second one of the three load pressures is the load pressure of the bucket cylinder 15 corresponding to the second control valve 70B. Third one of the three load pressures is the load pressure of the auxiliary actuator corresponding to the third control valve 70C.

In addition, the first fluid tube 141 is connected to a flow rate compensation valve 180, and the PLS signal pressure is transmitted to the flow rate compensation valve 180. The second fluid tube 142 (also referred to as a PPS fluid tube) connects the flowrate compensation valve 180 to an output side of the first hydraulic pump P1. A PPS signal pressure is capable of being applied to the second fluid tube 142, the PPS signal pressure being an output pressure of the operation fluid of the first hydraulic pump P1. The output pressure of the operation fluid from the first hydraulic pump P1 is transmitted to the flow rate compensation valve 180.

The swash plate controller 181 is a device including a piston, a housing, and a rod. The piston being configured to be moved by a pressure. The housing being configured to house the piston. The rod is coupled to the piston. One end portion of the housing is connected to the flow rate compensation valve 180, and the other end portion of the housing is connected to the output side of the first hydraulic pump P1. The rod (a moving portion) of the swash plate controller 181 is connected to the swash plate of the first hydraulic pump P1. The rod is stretched and shortened to change an angle of the swash plate.

The flow rate compensation valve 180 is a valve configured to control the swash plate controller 181 on the basis of the PLS signal and the PPS signal. The flow rate compensation valve 180 applies a pressure to one end portion of the swash plate controller 181 such that a differential pressure between the PPS signal pressure and the PLS signal pressure (a first differential pressure) is adjusted to a predetermined pressure. That is, the flow rate compensation valve 180 stretches and shortens the rod disposed on the other end portion of the swash plate controller 181 such that the differential pressure between the PPS signal pressure and the PLS signal pressure (the first differential pressure) can be constant.

As described above, the load sensing system changes the angle of the swash plate to obtain the constant differential pressure, and thus the output rate from the first hydraulic pump P1 can be adjusted regardless of the load pressure.

Meanwhile, the hydraulic system includes an unload valve 136. A branched fluid tube is connected to the unload valve 136. The branched fluid tube is branched from the fluid tube 144. The unload valve 136 is configured to be switched to a first position 136a and to a second position 136b. The first position 136*a* is provided for discharging an operation fluid to the operation fluid tank 22, the operation fluid being in the branched fluid tube of the first fluid tube 144. The second position 136*b* is provided for blocking the branched fluid tube.

Regarding a switching pressure of the unload valve 136, a differential pressure between the output pressure of the hydraulic pump P1 and a pressure of the operation fluid introduced to the flow rate compensation valve 180 is set to be higher than the first differential pressure. When the pressure of the operation fluid applied to the unload valve 136 is higher than the switching pressure, the unload valve 136 is switched to the first position 136*a*. The hydraulic system according to the embodiment includes the unload valve 136. However, the unload valve is not required necessarily.

The hydraulic system includes a change device 135 configured to change a pressure generated in the first fluid tube 141 (the PLS circuit). The change device 135 is configured to decrease the pressure generated in the first fluid tube 141, that is, the highest load pressure applied to the first fluid tube 141.

Thus, the change device 135 decreases the PLS signal pressure, the PLS signal pressure being to be inputted to the flow rate compensation valve 180, and thereby changes an angle of the swash plate of the first hydraulic pump P1 toward a direction where the pressure of the operation fluid is decreased.

In the embodiment, the pressure is increased in the first fluid tube 141, the change device 135 such as a relief valve disposed on the first fluid tube 141 is operated, and then the operation fluid is discharged from the change device 135. As the result, a flow rate of the first fluid tube 141 is increased, a flow rate of the check valve and the like disposed on the first fluid tube 141 (the PLS fluid tube) is increased, and thus the pressure losses are caused in an intermediate portion of the first fluid tube 141 (a portion having a small diameter serving as a throttle), the check valve, and the like.

When the pressure losses exceed the first differential pressure, the swash plate of the first hydraulic pump P1 moves toward a direction to reduce the output rate of the operation fluid. The hydraulic system according to the embodiment is capable of returning an angle of the swash plate of the first hydraulic pump P1, and thus a flow rate of the operation fluid outputted from the first hydraulic pump P1 can be arbitrarily set.

In particular, the change device 135 includes a third fluid tube (a third fluid path) 143 and a variable relief valve 152. The third fluid tube 143 is a fluid tube (a fluid path) connected to the first fluid tube 141 and configured to discharge the operation fluid. The first fluid tube 141 includes a section 141*a* and a section 141*b*. The section 141*a* is disposed between the throttle 147 and the flow rate compensation valve 180. The section 141*b* is disposed between the pressure compensation valve 151 and the throttle 147. One end of the third fluid tube 143 is connected to the section 141*a*.

The other end of the third fluid tube 143 is connected to the operation fluid tank 22. The other end of the third fluid tube 143 may be connected to a suction port of the second hydraulic pump P2 and may be connected to another portion.

The variable relief valve 152 is disposed on an intermediate portion of the third fluid tube 143, and is configured to change a setup pressure for relieving. The variable relief valve 152 may be a pilot-pressure variable relief valve, an electromagnetic variable relief valve, a manual variable relief valve, or the like. The pilot-pressure variable relief valve is configured to change the setup pressure for relieving with use of the pilot fluid (the pilot pressure). The electromagnetic variable relief valve is configured to change the setup pressure for relieving with use of the electric signal (the control signal). The manual variable relief valve is configured to manually set the setup pressure for relieving.

For example, a member (a change member) for changing the setup pressure of the variable relief valve 152 is disposed around the operator seat 8. An operator operates the change member, and thereby the setup pressure of the variable relief valve 152 is changed arbitrarily.

As shown in FIG. 5, the control device 165 is connected to the variable relief valve 152. In the configuration, the setup pressure of the variable relief valve 152 may be changed in accordance with the control signal (the electric signal) of the control device 165.

For example, a revolution sensor may be included in the control device 165. The revolution sensor is configured to detect a revolution speed of the motor 29 (for example, the engine revolution speed). Then, the control device 165 calculates the setup pressure for relieving of the variable relief valve 152 on the basis of a difference between a real engine revolution speed (an actual engine revolution speed) detected by the revolution sensor and a target engine revolution speed.

The control device 165 outputs the control signal to the variable relief valve 152, the control signal corresponding to the calculated setup pressure of the variable relief valve 152. The setup pressure of the variable relief valve 152 is set in accordance with the control signal of the control device 165.

Or, a temperature sensor may be included in the control device 165. The temperature sensor is configured to detect a temperature of the operation fluid. Then, the control device 165 calculates the setup pressure for relieving of the variable relief valve 152 on the basis of the temperature of the operation fluid detected by the temperature sensor.

The control device 165 outputs a control signal to the variable relief valve 152. The control signal corresponds to the calculated setup pressure of the variable relief valve 152. The temperature sensor may be a sensor configured to detect a water temperature, a sensor configured to detect a temperature of the engine oil, or a sensor configured to detect an outdoor temperature, instead of the sensor configured to detect the temperature of the operation fluid.

In that case, the control device 165 calculates the setup pressure of the variable relief valve 152 on the basis of a value detected by the temperature sensor, and sets the setup pressure of the variable relief valve 152.

Or, the control device 165 may be provided with a switch configured to set an operation mode such as a power mode, an energy-save mode, a mode for activating an air conditioner, a mode for traveling, a mode for activating an attachment, and the like. The control device 165 calculates the setup pressure of the variable relief 152 in accordance with the operation mode, and sets the setup pressure of the variable relief valve 152.

A type of the auxiliary actuator attached to the work machine may be inputted to the control device 165. The control device 165 calculates the setup pressure of the variable relief valve 152 in accordance with the type of the auxiliary attachment, and sets the setup pressure of the variable relief valve 152.

As described above, the first fluid tube 141 includes the third fluid tube 143, and further the third fluid tube 143 includes the variable relief valve 152. In this manner, a pressure generated in the section 141*a* between the flow rate compensation valve 180 and the throttle 147 of the first fluid tube 141 can be varied. That is, the variable relief valve 152 is capable of decreasing the pressure generated in the section 141a of the first fluid tube 141 (the PLS fluid tube).

In addition, the throttle 147 may be a throttle (an orifice), and may be constituted of a tube member such as a pipe having a portion having a smaller diameter than a diameter of the other portion. The throttle 147 may be constituted of other components.

Figure 6:
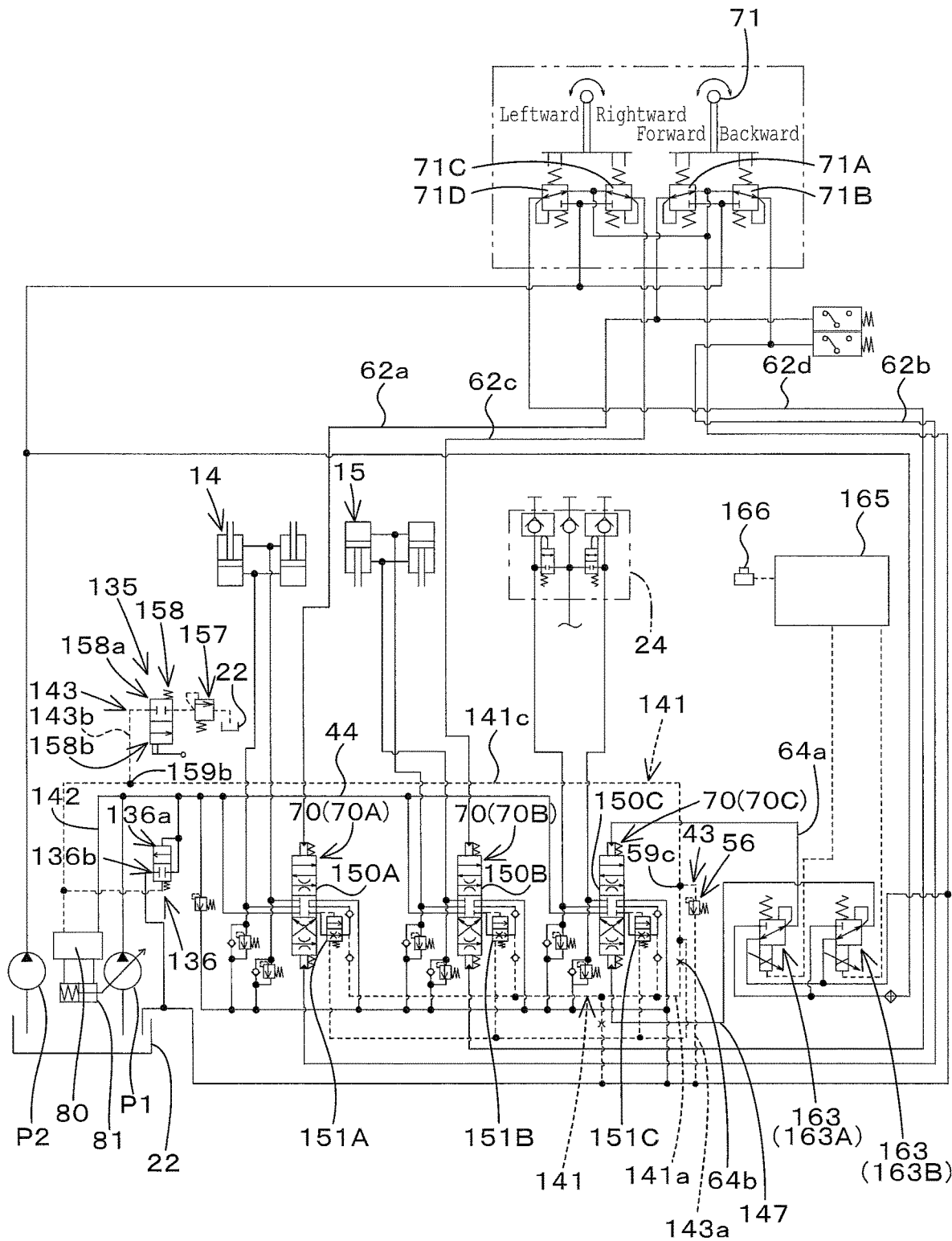
FIG. 6 is a view illustrating a first modified example of the hydraulic system for operating according to the third embodiment, the hydraulic system being included in the work machine.

FIG. 6 shows a first modified example of the hydraulic system (a modified example of the change device). Referring to FIG. 6, the first modified example according to the embodiment will be explained.

The change device 135 includes the third fluid tube 143, a first relief valve 156, a second relief valve 157, and a switch valve 158. The third fluid tube 143 includes a first discharge fluid tube (a first discharge fluid path) 143a and a second discharge fluid tube (a second discharge fluid path) 143b.

In the first fluid tube 141, the first discharge fluid tube 143a is a fluid tube connected to a downstream portion of the pressure compensation valve 151C. The first discharge fluid tube 143a is connected to an operation fluid tank 22 and the like.

In the first fluid tube 141, the second discharge fluid tube 143b is a fluid tube connected to a section 41c between the flow rate compensation valve 180 and a connecting portion 159a. The connecting portion 159a connects the first fluid tube 141 to the first discharge fluid tube 143a. The second discharge fluid tube 143b is connected to the operation fluid tank 22 and the like.

The first discharge fluid tube 143a and the second discharge fluid tube 143b may be connected to the suction ports of the first hydraulic pump P1 and the second hydraulic pump P2 or may be connected to the other portions, instead of the operation fluid tank 22.

The first relief valve 156 is disposed on the third fluid tube 143, that is, on an intermediate portion of the first discharge fluid tube 143a.

The second relief valve 157 is connected to the third fluid tube 143 separately from the first relief valve 156. The second relief valve 157 is disposed on an intermediate portion of the second discharge fluid tube 143b. The second relief valve 157 has a setup pressure lower than the setup pressure of the first relief valve 156.

In particular, a hydraulic system of a second modified example includes a first relief valve (a high-pressure relief valve) 156 and a second relief valve (a low-pressure relief valve) 157. The first relief valve 156 has a high setup pressure. The second relief valve 157 has a low setup pressure. In addition, each of the first relief valve 156 and the second relief valve 157 may be a variable relief valve configured to change the setup pressure and may be a relief valve having a fixed setup pressure.

The second relief valve 157 has the setup pressure lower than the setup pressure of the first relief valve 156 even when each of the first relief valve 156 and the second relief valve 157 is constituted of the variable relief valve.

In addition, the throttle 147 is disposed between the control valve 70 (the direction switch valve 150) and the third fluid tube 143 (the first discharge fluid tube 143a and the second discharge fluid tube 143b).

The switch valve 158 is a valve configured to open and close the third fluid tube 143. The switch valve 158 is disposed on an intermediate portion of the second discharge fluid tube 143b, that is, on an upper stream portion of the second relief valve 157. In particular, the switch valve 158 is disposed in the second discharge fluid tube 143b on a section between the second relief valve 157 and a connecting portion 159b. The connecting portion 159b connects the second discharge fluid tube 143b to the first fluid tube 141.

The switch valve 158 is a two-position switch valve configured to be switched to the first position 158 and to the second position 158B. The switch valve 158 is switched in accordance with a manual operation, a pressure of the operation fluid (the pilot pressure), or the electric signal (the control signal). In a case of the manual operation, the switch valve 158 is connected to an operation lever and the like configured to be swingable. The switch valve 158 is switched by moving the operation lever. In a case of the electric signal, the control device 165 described above is connected to a solenoid of the switch valve 158.

For example, the control device 165 judges whether to use the second relief valve (the low-pressure relief valve) 57, based on the difference between the actual engine revolution speed and the target engine revolution speed. In a case where the second relief valve (the low-pressure relief valve) 57 is used, the control device 165 outputs the control signal to the switch valve 158, and thus switches the switch valve 158 from the first position 158a to the second position 158b.

The control device 165 may switch the switch valve 158 to the second position 158b on the basis of any of values of the temperature sensors (the temperature of the operation fluid, the water temperature, the temperature of the engine oil, and the outdoor temperature) other than the engine revolution speed as shown in the first embodiment.

Or, the control device 165 may switch the switch valve 158 to the second position 158b on the basis of the operation mode such the a power mode, the energy-save mode, the mode for activating an air conditioner, the mode for traveling, the mode for activating an attachment, and the like. In addition, the control device 165 may switch the switch valve 158 to the second position 158b on the basis of the type of the auxiliary actuator.

According to the first modified example, the switch valve 158 is switched to the second position 158b, and thereby the highest load pressure applied to the first fluid tube 144 is reduced. And, the switch valve 158 is switched to the first position 158a, and thereby the highest load pressure is maintained. That is, the switching of the switch valve 158 changes the highest load pressure capable of decreasing the flow rate of the first hydraulic pump P1.

That is, the first relief valve 156 and the second relief valve 157 are operated as needed, and thereby the flow rate outputted from the first hydraulic pump P1 can be adjusted.

A hydraulic system for a work machine includes a plurality of hydraulic actuators, a hydraulic pump to output an operation fluid, a plurality of control valves 70 to control an operation of the hydraulic actuators, a first fluid tube 141 capable of receiving the highest load pressure in the operation of the hydraulic actuators, a second fluid tube 142 capable of receiving an output pressure of the hydraulic pump, a load sensing system to control the hydraulic pump such that a differential pressure between the output pressure of the hydraulic pump and the highest load pressure in the operation of the hydraulic actuator is to be constant, and a change device to change a pressure of the first fluid tube 141.

The change device 135 includes a third fluid tube 143 to discharge the operation fluid, the third fluid tube 143 being connected to the first fluid tube 141, and a variable relief valve 152 disposed on the third fluid tube 143.

The load sensing system includes a swash plate controller 181 to control a swash plate of the hydraulic pump, and a flow rate compensation valve 180 to operate the swash plate controller 181 such that a differential pressure between the output pressure and the pressure of the operation fluid of the first fluid tube 141, the flow rate compensation valve 180 being connected to the first fluid tube 141. The controller 70 includes a direction switch valve 150 to switch a direction of the operation fluid. The flow rate compensation valve 180 and the third fluid tube 143 are connected to the first fluid tube 141.

The change device 135 includes the third fluid tube 143 to discharge the operation fluid, the third fluid tube 143 being connected to the first fluid tube 141, a first relief valve 156 disposed on the third fluid tube 143, and a second relief valve 157 having a setup pressure lower than a setup pressure of the first relief valve 156, the second relief valve 157 being disposed on the third fluid tube 143 separately from the first relief valve 156.

The change device 135 includes a switch valve 158 capable of opening or closing the third fluid tube 143.

A throttle 147 is disposed on the first fluid tube between the direction switch valve 150 and the flow rate compensation valve 180. The change device 135 is connected to the first fluid tube 141 between the throttle 147 and the flow rate compensation valve 180.

The load sensing system includes the swash plate controller 181 to control a swash plate of the hydraulic pump, and the flow rate compensation valve 180 to operate the swash plate controller 181 such that a differential pressure between the output pressure and a pressure of the operation fluid of the first fluid tube 141 is to be constant, the flow rate compensation valve 180 being connected to the first fluid tube 141. The control valve 70 includes the direction switch valve 150 to switch a direction of the operation fluid. The flow rate compensation valve 180 is connected to the first fluid tube 141. The third fluid tube 143 includes a first discharge fluid tube 143a connected to a section of the first fluid tube between the flow rate compensation valve 180 and the direction switch valve 150, and a second discharge fluid tube 143b connected to a section of the first fluid tube 141 between the flow rate compensation valve 180 and a connecting portion connected to the first discharge fluid tube 143a. The first relief valve 156 is disposed on the first discharge fluid tube 143a. The second relief valve 157 and the switch valve 158 are disposed on the second discharge fluid tube 143b.

The load sensing system includes the swash plate controller 181 to control a swash plate of the hydraulic pump, and the flow rate compensation valve 180 to operate the swash plate controller 181 such that a differential pressure between the output pressure and a pressure of the operation fluid of the first fluid tube 141 is to be constant, the flow rate compensation valve 180 being connected to the first fluid tube 141. The control valve 70 includes the direction switch valve 150 to switch a direction of the operation fluid. The flow rate compensation valve 180 is connected to the first fluid tube 141. The third fluid tube 143 includes a first discharge fluid tube 143a connected to a section of the first fluid tube between the flow rate compensation valve 180 and the direction switch valve 150, and a second discharge fluid tube 143b connected to a section of the first fluid tube 141 between the flow rate compensation valve 180 and a connecting portion connected to the first discharge fluid tube 143a. The first relief valve 156 is disposed on the second discharge fluid tube 143b. The second relief valve 157 and the switch valve 158 are disposed on the first discharge fluid tube 143a.

The throttle 147 is disposed between the direction switch valve 150 and the third fluid tube 143.

Meanwhile, a work machine including a load sensing system are required to adequately reduce an output rate from the hydraulic pump with an energy loss suppressed.

The embodiments described above provide the hydraulic systems for the work machines configured to change the pressure for decreasing the flow rate of the operation fluid outputted from the hydraulic pump.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

What is claimed is:

1. A hydraulic system for a work machine, comprising:
   a prime mover;
   a setup member via which a first target revolution speed of the prime mover is set among target revolution speeds;
   a hydraulic pump to be operated by the prime mover to output an operation fluid;
   an operation valve to receive the operation fluid outputted from the hydraulic pump to set a pressure of the operation fluid outputted from the hydraulic pump to be a first pressure;
   a hydraulic device to be operated by the operation fluid passing through the operation valve;
   a memory to store
      first control characteristics indicating relations between the first pressure and an actual revolution speed of the prime mover, the first control characteristics corresponding to the target revolution speeds, respectively,
      a second control characteristic indicating a relation between the first pressure and the actual revolution speed of the prime mover and having an inclination smaller than inclinations of the first control characteristics, and
      threshold values corresponding to the target revolution speeds, respectively, such that a larger one of the threshold values corresponds to a larger one of the target revolution speeds; and
   a controller to set the first pressure based on the second control characteristic when a dropping amount of the actual revolution speed from the first target revolution speed is less than a threshold value of the threshold values and to set the first pressure based on the first control characteristics instead of the second control characteristic when the dropping amount of the actual revolution speed from the first target revolution speed is the threshold value or more,
   wherein the first control characteristics include one of the first control characteristics corresponding to a second target revolution speed of the target revolution speeds and another of the first control characteristics corresponding to a third target revolution speed of the target revolution speeds, the third target revolution speed being lower than the second target revolution speed,
   wherein the one of the first control characteristics and the another of the first control characteristics are branched from the second control characteristic, the first pressure indicated by the one of the first control characteristics being smaller than the first pressure indicated by the second control characteristic at a same value of the actual revolution speed, the first pressure indicated by the another of the first control characteristics being smaller than the first pressure indicated by the second control characteristic at another same value of the actual revolution speed, and wherein the controller sets the first pressure based on the one of the first control characteristics instead of the second control characteristic when the first target revolution speed is the second target revolution speed and the dropping amount is equal to or more than a first threshold value of the threshold values, and sets the first pressure based on the another of the first control characteristics instead of the second control characteristic when the first target revolution speed is the third target revolution speed and the dropping amount is equal to or more than a second threshold value of the threshold values, the second threshold value being smaller than the first threshold value.

2. A hydraulic system for a work machine, comprising:

a prime mover;

a setup member via which a first target revolution speed of the prime mover is set among target revolution speeds;

a hydraulic pump to be operated by the prime mover to output an operation fluid;

an operation valve to receive the operation fluid outputted from the hydraulic pump to set a pressure of the operation fluid outputted from the hydraulic pump to be a first pressure;

a hydraulic device to be operated by the operation fluid passing through the operation valve;

a memory to store
  first control characteristics indicating relations between the first pressure and an actual revolution speed of the prime mover, the first control characteristics corresponding to the target revolution speeds, respectively, and
  a second control characteristic indicating a relation between the first pressure and the actual revolution speed of the prime mover and having an inclination smaller than inclinations of the first control characteristics; and a controller to set the first pressure based on the second control characteristic when a load less than a load threshold value is applied to the prime mover and to control the operation valve based on the first control characteristics instead of the second control characteristic when the load equal to or more than the load threshold value is applied to the prime mover, wherein the first control characteristics include one of the first control characteristics corresponding to a second target revolution speed of the target revolution speeds and another of the first control characteristics corresponding to a third target revolution speed of the target revolution speeds, the third target revolution speed being lower than the second target revolution speed, the another of the first control characteristics having a second inclination larger than a first inclination of the one of the first control characteristics, wherein the one of the first control characteristics and the another of the first control characteristics are branched from the second control characteristic, the first pressure indicated by the one of the first control characteristics being smaller than the first pressure indicated by the second control characteristic at a same value of the actual revolution speed of the prime mover, the first pressure indicated by the another of the first control characteristics being smaller than the first pressure indicated by the second control characteristic at another same value of the actual revolution speed, and wherein the controller sets the first pressure based on the one of the first control characteristics instead of the second control characteristic when the first target revolution speed is the second target revolution speed and the load applied to the prime mover is the load threshold value or more, and sets the first pressure based on the another of the first control characteristics having the second inclination larger than the first inclination of the one of the first control characteristics instead of the second control characteristic when the first target revolution speed is the third target revolution speed and the load applied to the prime mover is the load threshold value or more.

3. The hydraulic system according to claim 1, comprising: a switch via which the first control characteristics is changed.

4. The hydraulic system according to claim 1, comprising: a switch via which the threshold values are changed.

5. A hydraulic system for a work machine, comprising:

a prime mover;

a setup member via which a first target revolution speed of the prime mover is set among target revolution speeds;

a hydraulic pump to be operated by the prime mover to output an operation fluid;

an operation valve to receive the operation fluid outputted from the hydraulic pump to set a pressure of the operation fluid outputted from the hydraulic pump to be a first pressure;

a hydraulic device to be operated by the operation fluid passing through the operation valve;

a memory to store
  first control characteristics indicating relations between the first pressure and an actual revolution speed of the prime mover, the first control characteristics corresponding to the target revolution speeds, respectively,
  a second control characteristic indicating a relation between the first pressure and the actual revolution speed of the prime mover and having an inclination smaller than inclinations of the first control characteristics; and a controller to set the first pressure based on the second control characteristic when a dropping amount of the actual revolution speed from the first target revolution speed is less than a threshold value of threshold values and to control the operation valve based on the first control characteristics instead of the second control characteristic when the load equal to or more than a load threshold value is applied to the prime mover, wherein the first control characteristics include one of the first control characteristics corresponding to a second target revolution speed of the target revolution speeds and another of the first control characteristics corresponding to a third revolution speed of the target revolution speeds, the third target revolution speed being lower than the second target revolution speed, the another of the first control characteristics having a second inclination larger than a first inclination of the one of the first control characteristics, wherein the one of the first control characteristics and the another of the first control characteristics are branched from the second control characteristic, the first pressure indicated by the one of the first control characteristics being smaller than the first pressure indicated by the second control characteristic at a same value of the actual revolution speed of the prime mover, the first pressure indicated by the another of the first control characteristics being smaller than the first pressure indicated by the second control characteristic at another same value of the actual revolution speed of the prime mover, and wherein the controller sets the first pressure based on the one of the first control characteristics instead of the second control characteristic when the first target revolution speed is the second target revolution speed and the dropping amount is equal to or more than a first threshold value of the threshold values, and sets the first pressure based on the another of the first control characteristics having the second inclination larger than the first inclination of the one of the first control characteristics instead of the second control characteristic when the first target revolution speed is the third target revolution speed and the dropping amount is equal to or more than a second threshold value of the threshold values.

6. The hydraulic system according to claim 5, wherein the threshold values are respectively set for the target revolution speeds, a larger one of the threshold values corresponding to a larger one of the target revolution speeds, and wherein the controller sets the first pressure based on the one of the first control characteristics instead of the second control characteristic when the first target revolution speed is the second target revolution speed and the dropping amount is the first threshold value or more, and sets the first pressure based on the another of the first control characteristics having the second inclination larger than the first inclination of the one of the first control characteristics instead of the second control characteristic when the first target revolution speed is the third target revolution speed and the dropping amount is equal to or more than the second threshold value that is smaller than the first threshold value.

7. The hydraulic system according to claim 1, wherein the memory stores third characteristic identifying a relation between the first pressure and the actual revolution speed, the third characteristic being continuous with the first control characteristics and having a third inclination smaller than the inclinations of the first control characteristics, the first pressure indicated by the third characteristic being smaller than the first pressure indicated by the one of the first control characteristics at a same value of the actual revolution speed, the first pressure indicated by the third characteristic being smaller than the first pressure indicated by the another of the first control characteristics at another same value of the actual revolution speed, wherein the controller sets the first pressure based on the second control characteristic when the dropping amount is less than the threshold value, wherein the controller sets the first pressure based on the first control characteristics instead of the second control characteristic when the dropping amount is the threshold value or more in a state where the first pressure is set based on the second control characteristic, and wherein the controller sets the first pressure based on the third characteristic having the third inclination smaller than the inclinations of the first control characteristics instead of the first control characteristics when the actual revolution speed is a predetermined speed or less in a state where the first pressure is set based on the first control characteristics.

8. The hydraulic system according to claim 3, wherein the memory stores third characteristic identifying a relation between the first pressure and the actual revolution speed, the third characteristic being continuous with the first control characteristics and having a third inclination smaller than the inclinations of the first control characteristics, the first pressure indicated by the third characteristic being smaller than the first pressure indicated by the one of the first control characteristics at a same value of the actual revolution speed, the first pressure indicated by the third characteristic being smaller than the first pressure indicated by the another of the first control characteristics at another same value of the actual revolution speed, wherein the controller sets the first pressure based on the second control characteristic when the dropping amount is less than the threshold value, wherein the controller sets the first pressure based on the first control characteristics instead of the second control characteristic when the dropping amount is the threshold value or more in a state where the first pressure is set based on the second control characteristic, and wherein the controller sets the first pressure based on the third characteristic having the third inclination smaller than the inclinations of the first control characteristics instead of the first control characteristics when the actual revolution speed is a predetermined speed or less in a state where the first pressure is set based on the first control characteristics.

9. The hydraulic system according to claim 4, wherein the memory stores third characteristic identifying a relation between the first pressure and the actual revolution speed, the third characteristic being continuous with the first control characteristics and having a third inclination smaller than the inclinations of the first control characteristics, the first pressure indicated by the third characteristic being smaller than the first pressure indicated by the one of the first control characteristics at a same value of the actual revolution speed, the first pressure indicated by the third characteristic being smaller than the first pressure indicated by the another of the first control characteristics at another same value of the actual revolution speed, wherein the controller sets the first pressure based on the second control characteristic when the dropping amount is less than the threshold value, wherein the controller sets the first pressure based on the first control characteristics instead of the second control characteristic when the dropping amount is the threshold value or more in a state where the first pressure is set based on the second control characteristic, and wherein the controller sets the first pressure based on the third characteristic having the third inclination smaller than the inclinations of the first control characteristics instead of the first control characteristics when the actual revolution speed is a predetermined speed or less in a state where the first pressure is set based on the first control characteristics.

10. The hydraulic system according to claim 5, wherein the memory stores third characteristic identifying a relation between the first pressure and the actual revolution speed, the third characteristic being continuous with the first control characteristics and having a third inclination smaller than the inclinations of the first control characteristics, the first pressure indicated by the third characteristic being smaller than the first pressure indicated by the one of the first control characteristics at a same value of the actual revolution speed, the first pressure indicated by the third characteristic being smaller than the first pressure indicated by the another of the first control characteristics at another same value of the actual revolution speed, wherein the controller sets the first pressure based on the second control characteristic when the dropping amount is less than the threshold value, wherein the controller sets the first pressure based on the first control characteristics instead of the second control characteristic when the dropping amount is the threshold value or more in a state where the first pressure is set based on the second control characteristic, and wherein the controller sets the first pressure based on the third characteristic having the third inclination smaller than the inclinations of the first control characteristics instead of the first control characteristics when the actual revolution speed is a predetermined speed or less in a state where the first pressure is set based on the first control characteristics.

11. The hydraulic system according to claim 6, wherein the memory stores third characteristic identifying a relation between the first pressure and the actual revolution speed, the third characteristic being continuous with the first control characteristics and having a third inclination smaller than the inclinations of the first control characteristics, the first pressure indicated by the third characteristic being smaller than the first pressure indicated by the one of the first control characteristics at a same value of the actual revolution speed, the first pressure indicated by the third characteristic being smaller than the first pressure indicated by the another of the first control characteristics at another same value of the actual revolution speed, wherein the controller sets the first pressure based on the second control characteristic when the dropping amount is less than the threshold value, wherein the controller sets the first pressure based on the first control characteristics instead of the second control characteristic when the dropping amount is the threshold value or more in a state where the first pressure is set based on the second control characteristic, and wherein the controller sets the first pressure based on the third characteristic having the third inclination smaller than the inclinations of the first control characteristics instead of the first control characteristics when the actual revolution speed is a predetermined speed or less in a state where the first pressure is set based on the first control characteristics.

12. The hydraulic system according to claim 2, comprising:

a switch via which the first control characteristics are changed.

13. The hydraulic system according to claim 2, comprising:

a switch via which the load threshold value is changed.

14. The hydraulic system according to claim 3, comprising:

a switch via which the load threshold value is changed.

* * * * *